United States Patent [19]
McCarthy et al.

[11] Patent Number: 5,989,696
[45] Date of Patent: *Nov. 23, 1999

[54] ANTISTATIC COATED SUBSTRATES AND METHOD OF MAKING SAME

[75] Inventors: Donald C. McCarthy, Appleton; Debra D. Bowers, Menasha, both of Wis.

[73] Assignee: Fort James Corporation, Deerfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,697

[22] Filed: Feb. 13, 1996

[51] Int. Cl.$^6$ .............................. D04H 1/58; B32B 13/08; B32B 13/12; B05D 3/12
[52] U.S. Cl. ..................... 428/288; 428/289; 428/290; 428/325; 428/326; 428/331; 428/341; 428/342; 428/451; 428/452; 428/454; 428/461; 428/462; 428/464; 427/356; 427/365
[58] Field of Search ................................. 428/206, 207, 428/480, 922, 330, 331, 342, 288, 289, 290, 325, 326, 341, 451, 452, 454, 462, 461, 464; 427/356, 365

[56] References Cited

U.S. PATENT DOCUMENTS

| | | | |
|---|---|---|---|
| 3,018,189 | 1/1962 | Traver | 428/516 |
| 3,364,056 | 1/1968 | Seibel | 427/223 |
| 3,653,894 | 4/1972 | Levy et al. | 430/63 |
| 3,936,383 | 2/1976 | Daimon et al. | 428/421 |
| 4,072,769 | 2/1978 | Lidel | 427/561 |
| 4,166,054 | 8/1979 | Meeske et al. | 523/423 |
| 4,173,480 | 11/1979 | Woodward | 430/536 |
| 4,173,558 | 11/1979 | Beck | 524/390 |
| 4,181,567 | 1/1980 | Riddell et al. | 162/168.3 |
| 4,239,519 | 12/1980 | Beall et al. | 65/134.4 |
| 4,282,059 | 8/1981 | Davidson | 162/158 |
| 4,336,306 | 6/1982 | Fellows | 428/341 |
| 4,371,596 | 2/1983 | Sheibley | 429/144 |
| 4,613,542 | 9/1986 | Alexander | 442/118 |
| 4,739,003 | 4/1988 | Barr et al. | 524/446 |
| 4,749,444 | 6/1988 | Lorz et al. | 162/168.3 |
| 4,762,643 | 8/1988 | Bohrn et al. | 252/378 R |
| 4,775,586 | 10/1988 | Bohrn et al. | 428/324 |
| 4,786,558 | 11/1988 | Sumiya et al. | 428/454 |
| 4,854,971 | 8/1989 | Gane et al. | 106/286.5 |
| 4,867,844 | 9/1989 | Dessauer | 162/135 |
| 4,868,048 | 9/1989 | Barr et al. | 428/328 |
| 4,988,561 | 1/1991 | Wason | 423/331 |
| 5,015,334 | 5/1991 | Derrick | 162/168.1 |
| 5,023,227 | 6/1991 | Matoba et al. | 503/214 |
| 5,032,227 | 7/1991 | Derrick et al. | 162/168.1 |
| 5,070,067 | 12/1991 | Tani et al. | 503/219 |
| 5,071,512 | 12/1991 | Bixler et al. | 162/175 |
| 5,089,320 | 2/1992 | Straus et al. | 428/216 |
| 5,100,934 | 3/1992 | Glesias | 523/456 |
| 5,143,546 | 9/1992 | Yuasa et al. | 106/20 B |
| 5,178,730 | 1/1993 | Bixler et al. | 162/168.3 |
| 5,192,613 | 3/1993 | Work, III et al. | 428/363 |
| 5,194,120 | 3/1993 | Peats et al. | 142/168.3 |
| 5,198,490 | 3/1993 | Berg et al. | 524/443 |
| 5,223,098 | 6/1993 | Cluyse et al. | 162/181.2 |
| 5,231,068 | 7/1993 | Miyamoto et al. | 503/207 |
| 5,240,777 | 8/1993 | Wacher | 428/454 |
| 5,252,445 | 10/1993 | Timmerman et al. | 430/529 |
| 5,360,643 | 11/1994 | Wacher | 427/402 |
| 5,384,295 | 1/1995 | McWhinnie et al. | 502/5 |
| 5,385,771 | 1/1995 | Willetts et al. | 428/211 |
| 5,407,480 | 4/1995 | Payton et al. | 106/487 |
| 5,423,911 | 6/1995 | Coutelle et al. | 106/416 |
| 5,429,867 | 7/1995 | McCarthy et al. | 428/331 |
| 5,454,955 | 10/1995 | Albrecht et al. | 210/705 |
| 5,491,013 | 2/1996 | Holley | 428/922 |
| 5,494,738 | 2/1996 | Van Thillo et al. | 428/331 |

FOREIGN PATENT DOCUMENTS

| | | |
|---|---|---|
| 2113244 | 1/1994 | Canada . |
| 3169540 | 7/1991 | Japan . |

*Primary Examiner*—Rena L. Dye

[57] ABSTRACT

A laminate and a coated web suitable for use as containers exhibiting a static decay of at least 90% in less than 2 seconds while measured at +/−5,000 volts, at 10% relative humidity and 24 hours conditioning is disclosed. The laminate and coated web comprise a paper substrate or a synthetic fiber substrate, a first coating on at least one surface of said paper substrate comprising synthetic hectorite clay and optionally a second coating comprising an organic or inorganic pigment applied over at least one of said coatings. These laminates are useful as antistatic coated paper containers.

26 Claims, 6 Drawing Sheets

FIG. 6

Typical Corrugator Roll Profiles

| FLUTE TYPE | FLUTE PER LINEAR FOOT | APPROXIMATE HEIGHT |  |
|---|---|---|---|
| A-FLUTE | 27-36 | 0.17 to 0.20 INCH | |
| B-FLUTE | 44-50 | 0.08 to 0.10 INCH | |
| C-FLUTE | 36-42 | 0.13 to 0.15 INCH | |
| E-FLUTE | 87-93 | 0.04 to 0.06 INCH | |
| F-FLUTE | 125-131 | 0.025 to 0.035 INCH | |

ANTISTATIC COATED SUBSTRATES AND METHOD OF MAKING SAME

FIELD OF THE INVENTION

This invention relates to paper-pigment laminate exhibiting excellent antistatic properties, and to the method of making same. In its more specific aspects, this invention relates to a laminate comprising a substrate bearing an antistatic coating which may be continuous or discontinuous. This coating is especially suitable as a packaging material and exhibits excellent antistatic properties. Suitably the hectorite clay coating may have a pigment coating and a plastic overlay to protect the hectorite clay or pigment coating from excess wear. This invention also relates to a method for the manufacture of antistatic coatings which may be continuous or discontinuous.

BACKGROUND

A number of materials are particularly susceptible to accumulating a static charge. In the food packaging field where paper and plastic sheet or film are processed for use as packaging materials, sometimes as a laminate of paper and plastic are formed into a container for food or electronic chips and boards, the moving web can accumulate a large static charge. The sheet or film and the food contents being packaged can exhibit mutual repulsion or attraction thereby causing the food to bend away from the container. Further, this build-up of static electricity can interfere with the processing steps by clinging to the equipment, can attract dirt and contaminants from the air, and can cause electrical shock and fire. As a general rule the difficulties with static charge are greater as the relative humidity decreases. These materials vary in their susceptibility to accumulate a static charge, and to their rate of decay or dissipation of the charge.

Paper and plastic have a relatively high surface resistivity, and the charge decay for these materials occur at a relatively low rate. It is common practice in the art to reduce the accumulation of the static charge by increasing the rate of dissipation of the static charge such as by utilizing an antistatic agent. An effective agent must act at a relative humidity of below 40% and preferably below 25%. In accordance with the Static Decay Test, MIL-81 705 C, materials are tested at 15% relative humidity, and some industries use or require a test at 10% relative humidity. For these materials, the object is to achieve static decay similar to that of aluminum film or foil. Thus, according to this test, the substrate should exhibit a static decay of at least 90% in less than 0.2 second when measured at +5,000 volts and -5,000 volts, at 15% relative humidity, and 24 hours conditioning.

Synthetic hectorite clay, which is commercially available as "Laponite®" from Southern Clay Products, Inc., a subsidiary of Laporte Industries Ltd., is a natural swelling clay useful as a flow control agent, and more recently has been known to be used as an antistatic agent. Naturally occurring hectorite contains contaminants which are difficult to remove, and therefore synthetic hectorite was developed in the early 1960's as a pure form. It is shown in the art that the synthetic hectorite clay useful as an antistatic agent has a portion of the hydroxyl ions replaced by fluoride ions. Laponite® B and Laponite® S are fluoride containing hectorites marketed commercially by Southern Clay Products, Inc. We have found that hectorite clays not containing fluoride ions are also useful antistatic agents.

Two general procedures have been employed in the art to impart antistatic properties to various plastics. The first procedure involves the inclusion of various inorganic minerals, including synthetic hectorite, into the plastic prior to forming It into a film. The second approach has been to coat plastic films with a coating composition containing various inorganic materials, including synthetic hectorite.

There are many problems associated with coating films in order to provide a protective layer which has desirable properties, and certain of these disadvantages are set forth in U.S. Pat. No. 4,786,588. As is disclosed in this patent, protective layers containing inorganic substances can have insufficient covering properties and the surface of the layer can become rough and/or the coating can flake off during use. This prior art patent discloses one approach toward solving these problems in that the protective layer comprises a swellable silicate, a silanol compound, and an interlayer ion.

There is disclosed in the prior art in Japanese publication H3-169540 that the plastic film can be coated with a mixture of synthetic hectorite clay and kaolin, and an emulsion based adhesive having anti-blocking potential and Imparting adhesivity to the film. The resulting coated film exhibits improved properties, in particular antistatic and anti-blocking properties. According to the Japanese publication, these properties are not achieved without the mixture of hectorite and kaolin, together with the binder, as the coating composition.

The use of synthetic hectorite as a coating is disclosed in U.S. Pat. No. 4,173,480 for photographic sheet having a layered structure of paper, plastic, and a light-sensitive emulsion. According to this patent, photographic sheet material is prepared by sizing paper with gelatin, starch or carboxymethyl cellulose, then coating with a synthetic hectorite clay, specifically Laponite® S, and then applying a polymeric film which is corona treated to enhance the surface adhesion for the outer layer of a light-sensitive emulsion.

U.S. Pat. No. 5,429,867 and U.S. patent application Ser. No. 08/154,322 both assigned to the assignee of this invention disclose synthetic hectorite coated film and a two-component air-curable composition comprising hectorite clay, a peptizer and an epoxy ester.

SUMMARY OF THE INVENTION

In accordance with the present invention, there is provided a laminate of hectorite clay, organic and inorganic pigment and a substrate such as paper, spunbonded polyester and spunbonded olefin. This laminate is especially suitable as a packaging material. The paper is coated continuously and discontinuously with synthetic hectorite clay. In some uses It may be desirable to have a portion of the hydroxyl, which may or may not have ions in the hectorite clay, replaced with fluoride ions. A second, separate coating of an organic or inorganic pigment may be applied directly on the hectorite coating, these two coatings provide a dual coating of different composition. Suitable pigments includes clays, kaolin clay, talc, glass powder, alumina, titanium dioxide, zinc sulfide, calcium carbonates, hydrated alumina, bentonite, and extender pigments including hollow glass or organic spheres. These pigments are suitably applied directly over the hectorite coating, thereby providing a dual coating of different compositions to the paper web. The paper may be coated with the hectorite clay on one or both surfaces, and likewise the second coating of the pigment may be provided on one or both surfaces. Alternatively, a binder may be admixed with the hectorite clay, or with the pigment, or with both. Suitably one coated side of the substrate Is provided with an overlay of plastic film, thereby forming a laminated or unitary structure. The resulting laminate exhibits excellent antistatic properties having the ability to dissipate a static charge similar to that of aluminum foil.

Paper-like substrates are made with synthetic polymer fibers that are spunbonded, melt blown, or otherwise formed into a sheet in a papermaking process. An example of such a substrate is Tyvek®, a product of DuPont. Tyvek® is a spunbonded polyolefin produced by first spinning very fine continuous strands of high density polyethylene and then bonding them with heat and pressure. The paper-like product can be used as is or overcoated with a pigmented coating for enhanced graphics. Typical applications are for floppy disk sleeves, mailing envelopes, labels, courier pouches, and in garments for clean room environments. Tyvek® is suitably coated with Laponite® JS in a binder. Coatings were made using Meyer draw down rods to yield coating weights between 0.3 and 0.6 lbs.13000 sq. ft. ream. The static decay times (initial and 48 hrs. at 10% RH) are shown in Table 11 for samples with and without the hectorite coating on both high and low basis weight Tyvek®. The static decay properties listed in Table 11 are excellent and extend to other spunbonded, spun laced, melt blown, or substrates formed in a papermaking process with any combination of synthetic and wood fiber such as polymers and copolymers of propylene, polyester, aramid, or acrylic.

Representative synthetic fibers include: Nomex®, an aramid paper sold by DuPont; Reemay®, a spunbonded polyester sold by Reemay, Inc.; Typar®, a spunbonded polypropylene sold by Reemay, Inc.; Gor-Tex™, a fluorocarbon; Nextel, a ceramic; NICALON™, a silicon carbide; PTFE/Glass Fabrics, a teflon coated glass (fluorocarbon coated glass); and PTFE/Kevlar, a teflon coated kevlar (fluorocarbon coated imide polymer). Representative polymers formed into nonwoven products include: nylons, acrylics, polyolefins, ultra high density polyethylene, polyester, liquid crystal polymers, thermoplastic elastomers, and polymethylpentene.

It is well known that paper and plastic have electrostatic disadvantages in that these materials accumulate readily a static charge during the several processing steps. However, plastic is advantageous in that plastics are oil resistant, heat sealable, and exhibit high strength, and therefore plastic is particularly desirable for use in packaging such Items as food, especially as the interior layer for contact with the contents, e.g. food. The paper, on the other hand, is a more desirable surface for printing in that paper has superior ink holdout and presents a clearer, sharper picture and a more aesthetically pleasing image than plastic, paper is less expensive than plastic, and the finished paper/plastic laminated product in general offers greater overall strength as compared to a nonlaminated structure. Thus, in forming a laminated structure in accordance with the present invention, the structure is essentially devoid of any interfering static charge, as explained in greater detail below, and therefore the converting process, including the filling operation of a package, can be achieved at high processing speeds without losses and without danger of electric shock or fire.

The paper useful for the laminated structure, which may have a basis weight of from about 10 to 500 lbs/3,000 sq. ft. ream, may be provided with one or more additives or loadings, such as a size primarily to improve other properties such as opacity, strength, and the like. The paper is then coated continuously or discontinuously with synthetic hectorite clay in sufficient quantity to provide the desired antistatic properties, explained below in more detail. In some instances a portion of the hydroxyl ions in the hectorite clay have been replaced with fluoride ions. The hectorite clay is applied as an aqueous dispersion or mixture containing about 3 to 18 weight percent hectorite. The coating is dried by conventional means such as in a drying oven operated at about 110 to 300° F. Suitably a peptizer may be employed. A representative peptizer is tetrasodium pyrophosphate. The antistatic coating can be a continuous film if the hectorite clay is applied to a paper or paperboard surface with holdout using a printing press. The hectorite clay is applied to the paper surface on a printing press or paperboard with holdout, the antistatic coating can be a continuous film. However, when the hectorite coating is applied by a size press, the hectorite in the paper may not be continuous. The hectorite clay tends to fill in the voids in the paper structure rather than coating the fibers. In many applications substrates prepared from polyolefins, polyesters, polyaramids, and polyanilates can fully or partially replace the cellulosic moiety. These synthetic fibers should be spunbonded, melt blown, or produced by any other suitable method. This invention includes the use of synthetic fibers in combination with cellulosic fiber formed in the papermaking process.

A second coating of the pigment such as kaolin clay, talc, bentonite, glass powder, alumina, titanium dioxide, zinc sulfide, calcium carbonates, barium sulfite, extender pigments such as hollow glass or organic spheres and the like is applied separately over the hectorite coating, thereby forming a paper or synthetic fiber web bearing a dual coating of two distinctly different pigment compositions. The pigment such as kaolin clay is applied with a blade in the same manner as the hectorite clay but since It is applied on top of the hectorite clay It usually forms a coating Irrespective of the manner of application.

Suitably to protect the hectorite clay surface or the pigment surface a plastic film may be overlaid onto the paper or synthetic fiber coated surface as by extrusion, and the bonded structure formed as a laminate in order to provide a unitary structure. Both surfaces of the paper or synthetic fiber web may be coated with the hectorite and pigment compositions, and if so, both surfaces may be overlaid with a plastic film. When the laminate is converted into a package, the exposed surface of the plastic film is the surface that contacts the package contents, which is desirable because of the properties of plastic such as off resistance. Any of several plastic polymers or copolymers are useful for the invention, including, for example, polyolefins, polyesters, polyamides, polyvinyl, and copolymers such as the copolymer of ethylene and vinyl, and the plastic film may be a composite of two or more plastics. The plastic typically has a thickness of from about 0.5 to 5 mils, but the thickness used for the structure will depend largely on such factors as type of plastic, basis weight of the paper substrate, the thickness of the hectorite coating, and the end use.

The resulting laminate is particularly useful as a packaging material, and more especially for the packaging of electrical equipment such as semiconductors, personal computer boards and in packaging dry food, such as coffee, grated cheese, mashed potatoes, spices, etc. The resulting laminate exhibits a static charge decay similar to that of aluminum foil, and therefore can be handled easily during converting and processing, such as for packaging of foodstuffs. The pigmented coating such as kaolin clay coating, as the outermost coating, provides a structure characterized by superior ink holdout, brightness, opacity, and smoothness.

DESCRIPTION OF THE DRAWING

FIG. 6 is a table giving typical corrugated roll properties.

DETAILED DESCRIPTION OF THE INVENTION

Figure 1:
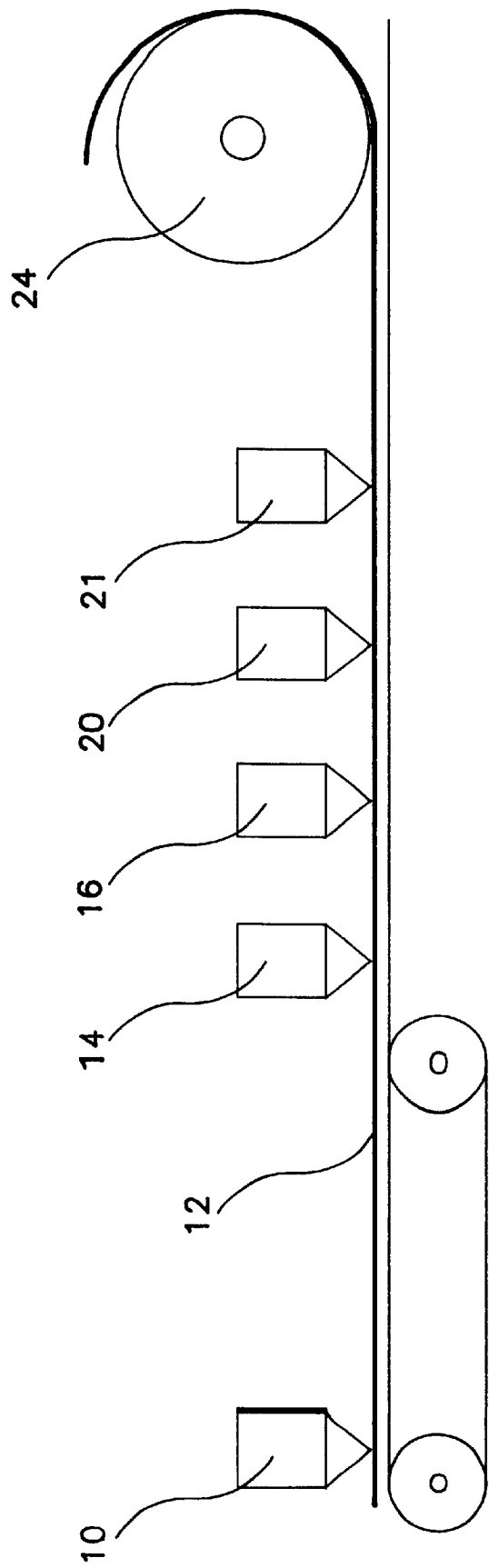
FIG. 1 is a schematic diagram illustrating the principal steps for the manufacture of the antistatic coated substrate such as paper, polyolefin or polyester of this invention.

The antistatic coating of the present invention may be made by using conventional or known equipment designed for such components and systems, although the invention is described hereinbelow with particular reference to a system, It should be understood that other systems are also applicable. Referring to the drawings wherein like reference numerals refer to similar parts throughout, there is shown in FIG. 1 one embodiment of the invention for the manufacture of the laminate Illustrating broadly and generally the steps in a manufacturing procedure. Accordingly, at step 10 a fibrous composite or webbing is condensed onto a continuous forming wire cloth or belt using conventional paper laying equipment (e.g., Fourdrinier machine J), thereby forming a paper web 12 or a synthetic fiber web 12. One or more additives such as a size, loading, strengthening agents, etc., may be added or applied at the wet end (not shown) or at the dryer section (not shown). A suitable size material is typically applied to impart bonding strength to the paper or synthetic fiber web, that is to aid in interfiber bonding. Typical size compositions include starch (usually modified starch), rosin, glue, gelatin, modified cellulose, synthetic resins, lattices, and waxes. A starch size is the preferred size, and it has been found the amount of size can range from about 0.4 g/m$^2$ to about 25 g/m$^2$ and preferably about 0.8 to 8.2 g/m$^2$. The paper may also include a filler such as clay (kaolin), calcium carbonate, or titanium dioxide, typically prepared as an aqueous slurry and then metered to the papermaking machine. The starch size improves the resistance of the paper to penetration by aqueous liquids, and the other fillers, loadings or additives Impart to the paper such properties as opacity, whiteness, smoothness, and strength. The addition or incorporation of any such materials as additives or loadings to the paper is conventional, and the use and amounts can be determined by one having skill in the art.

Where desired, a surface size is applied at step 14 such as by means of a size press at the drier section of the paper making process and typically when the paper moisture content is about 5% to 10% by weight. Any suitable size material may be used, which may assist in Imparting the desired degree of adhesivity to the paper for the hectorite coating, and typical sizes include starch, rosin, glue, gelatin, modified cellulose compounds, synthetic resins, lattices, and waxes. The amount of size applied to the paper web can be varied depending largely on such factors as basis weight of the paper, other additives incorporated into the paper web, the particular size used, and the amount of synthetic hectorite to be applied to the web. Starch is the preferred size, and it has been found the amount of size can range from about 0.4 g/m$^2$ to about 25 g/m$^2$.

Where desired, the resulting paper or synthetic fiber web, which exhibits high integrity, may be formed on a take-up roll, and then used as a source roll in the subsequent manufacture of the laminated structure. This take-up step, however, is not illustrated in the drawings, but rather the process is shown as essentially a continuous process. It should be understood, however, that these various manufacturing techniques and processing steps are within the skill of the art.

Figure 2:
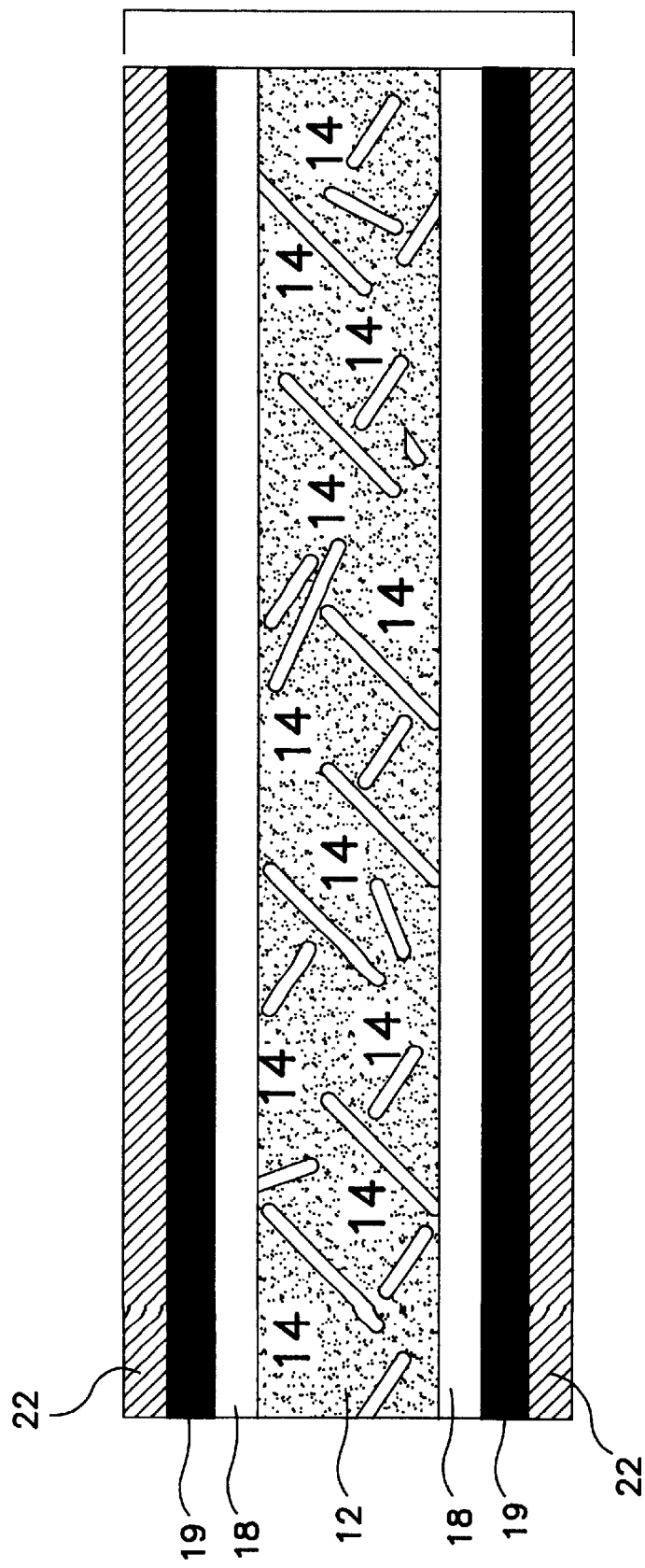
FIGS. 2 and 3 are an elevational side view in cross-section showing the details of the laminated structure of the invention, with certain features and the dimensions exaggerated for purposes of clarity. It is understood that the hectorite clay coating need not be continuous. When applied by the size press the hectorite in the paper fills in the voids in the paper structure rather than coating the fibers.
Figure 3:
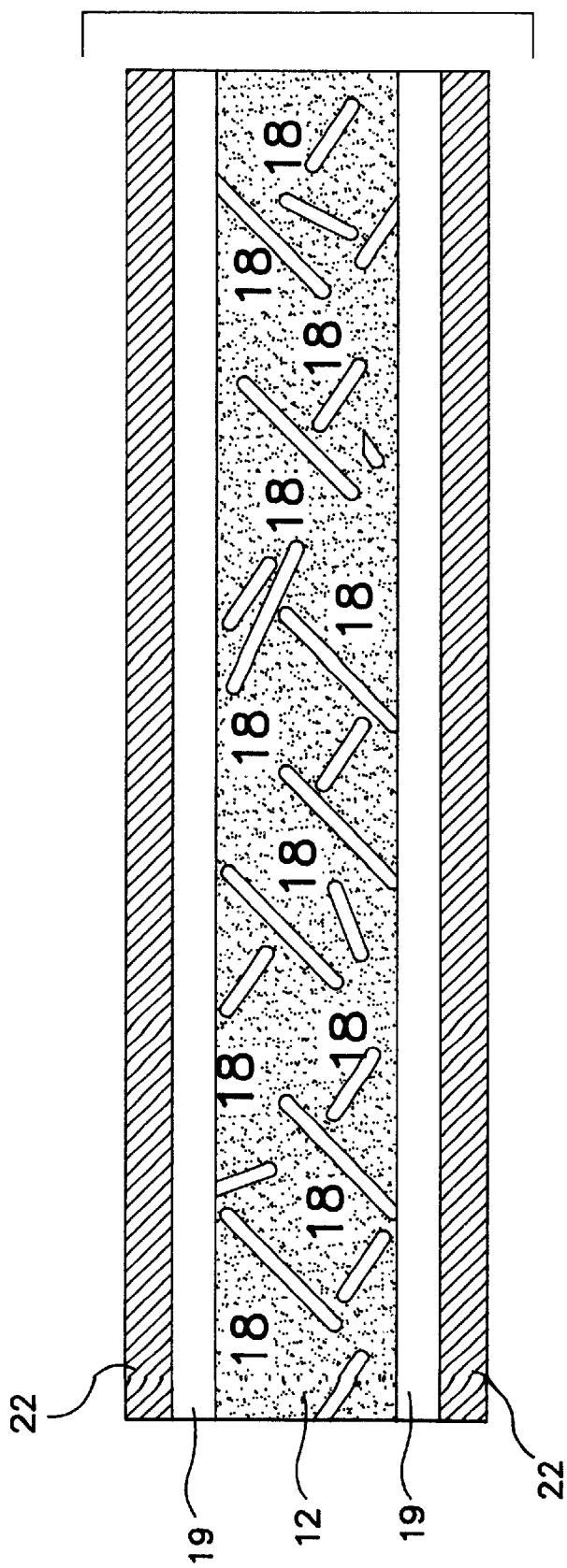
Figure 5:
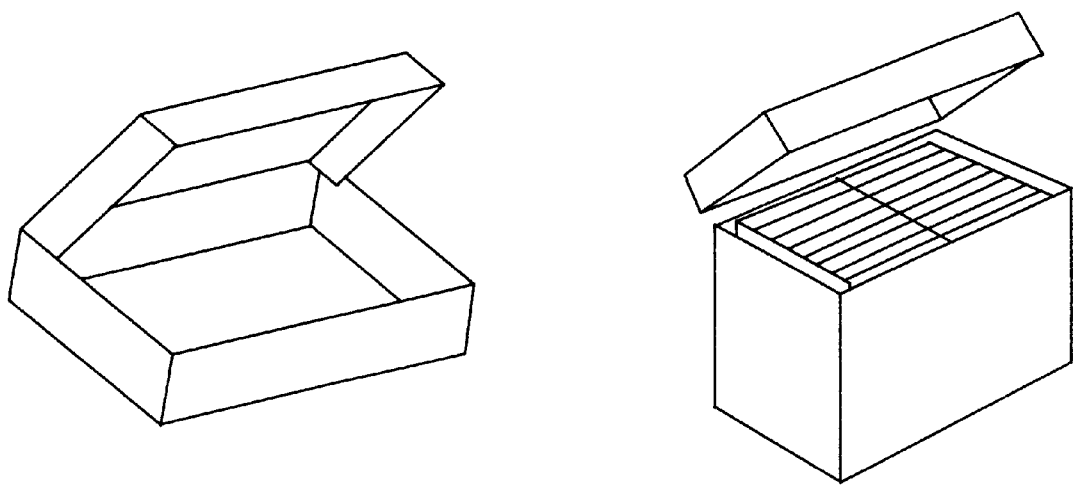
FIG. 5 is a drawing showing a corrugated box coated with hectorite clay.

The synthetic hectorite may be applied at step 16 with the starch size or at step 16 as an aqueous dispersion. The paper and synthetic fiber structures formed are shown in FIGS. 2, 3, and 5.

At step 16 in the process, synthetic hectorite clay is applied as an aqueous dispersion to the sized paper as coating 19, described below in greater detail, which is subsequently dried at a temperature of about 110 to 300° F. Also, it should be understood that both surfaces or facings of the paper or synthetic fiber web may be coated with hectorite clay. After the hectorite has been applied and is fixed to the web, a second coating 19 comprising of pigment may be applied at step 20, thereby forming a paper or a synthetic fiber bearing a dual coating on at least one surface thereof. In an alternative embodiment, an adhesive or binder may be added to or admixed with the aqueous hectorite dispersion and/or with the pigment to bind the particles together, and also to provide the desired degree of adhesivity to the paper for the hectorite coating and/or pigment coating. Suitable binders include: starch, animal glue, casein, soy protein, polyvinyl alcohol, stryrene-butadiene latex, and polyvinyl acetate. Starch is a preferred binder because of costs, availability, and sizing properties, and preferably the starch is modified chemically, enzymatically, or thermally, and these modified starches are commercially available. The starch concentration in the aqueous dispersion may range from about 3 to 50 weight percent, but this will depend largely on the desired viscosity for the dispersion, the method of application, and the basis weight of the paper or the synthetic fiber. The amount of binder applied to the paper or synthetic fiber web can be varied depending largely on such factors as basis weight of the paper or synthetic fiber, other additives incorporated into the paper or synthetic fiber web, the particular binder used, and the amount of synthetic hectorite and/or pigment such as kaolin to be applied to the web.

At step 21 of the process, a plastic overlay 22, which serves as the interior layer for a package or container, is applied to the coated surface of the paper 12. The plastic preferably is extruded directly onto the coated paper, and upon cooling, the resulting paper/plastic laminate is rolled on take-up roll 24. If both surfaces or facings of the paper or synthetic fiber are coated with one or both of the clay compositions, the plastic overlay may be applied to one or both surfaces of the paper or synthetic fiber. Hence, the laminate may comprise any one of the following combinations: (1) paper or synthetic fiber bearing a dual coating on one side only, and plastic overlay on that same side; (2) paper or synthetic fiber bearing a dual coating on both sides, and a plastic overlay on one side only; (3) paper or synthetic fiber bearing a dual coating on one side only and a single clay coating on the opposite side, and a plastic overlay on the dual coating; and (4) paper or synthetic fiber bearing a single or dual coating without a plastic overlay.

As stated above, hectorite is commercially available under the tradename "Laponite ®." These clays are comprised of magnesium silicates. A certain percentage of these silicates have a portion of the hydroxyl ions replaced with fluoride ions, and these exhibit a layered or platelet structure. The hectorite is applied as an aqueous dispersion or mixture. Because such dispersions have a tendency to gel, which become difficult to handle and apply, suitably a peptizer may be added to maintain a fluid dispersion. These sol forming grades, which are commercially available, are relatively stable and easy to apply to the paper or synthetic fiber substrate.

The layers or platelets of hectorite are about a nanometer thick and transparent and therefore are desirable as a coating. Particularly useful grades of Laponite® for this invention include Laponite® B, Laponite® S, and Laponite® JS which contain fluoride ions (the fluoride ions replace a portion of the hydroxyl ions) of approximately 5 to 6 percent by weight. Laponites not containing fluoride are also useful in our process. Useful peptizers incorporated in the formulation of the coating composition to maintain the dispersion include polyvalent phosphates, such as hexametaphosphates (e.g., calgon), and pyrophosphates (e.g., tetrasodium pyrophosphate). It is to be understood that there are certain grades of Laponite® to which a peptizer (e.g., tetrasodium pyrophosphate) has been added by the supplier of the clay. Laponite® S, for example, contains about 6% by weight tetrasodium pyrophosphate.

Thus, in accordance with the invention, synthetic hectorite, sometimes referred to as Type I Laponites or sodium magnesium lithium fluorosilicates, are useful in our process; however, Laponites not having fluoride ions are also useful in our process. In order to maintain the hectorite in aqueous dispersion, a suitable peptizer is used. If the synthetic hectorite as purchased, does not contain a peptizer, then such is added during the formulation. A desired dispersion grade or sol grade of hectorite includes a peptizer typically in the range of about 6 to 12 weight percent of the dry weight of hectorite. It is well known that paper properties vary with relative humidity. In particular, surface resistivity is known to vary five orders of magnitude ($10^5$) when the relative humidity changes, such as from 10 % to 90 %. The addition of synthetic hectorite to a paper structure, however, results in a laminate exhibiting a narrow range of surface resistivity change, $10^3$ or less, usually $10^2$ or less. A narrow range of surface resistivity change regardless of the humidity is beneficial because it provides for improved handling and feeding of sheeted materials.

The pigment such as kaolin clay is usually coated by a blade coating method and is placed on top of the hectorite clay.

The plastic overlay may be selected from any of a variety of plastics, polymers or copolymers used in the packaging industry, including composite or multilayer plastics of two or more polymers. The particular choice of plastic will depend largely upon the end use and ease of application. Suitable plastics include, for example, polyolefins (e.g., polyethylene and polypropylene), polyester, polyvinyl acetate, polyvinyl alcohol, polycarbonate, polyamides, polyimides, polyacrylates, and copolymers such as Surlyn (a copolymer of ethylene and a vinyl monomer with an acid group such as methacrylic acid or acrylic acid) manufactured by DuPont. Also it should be understood that a composite film comprising two or more plastic materials may be utilized as the overlay. Such composites are produced by co-extrusion, extrusion-laminating, and adhesive laminating. Such composite plastic films are advantageous in that they provide a superior oxygen barrier relative to a single film. The plastic film used as the overlay has a thickness of from about 0.5 mil to about 5 mils, but this thickness can vary depending largely upon the end use, the type of plastic, the thickness of the coating, and the basis weight of the paper.

As shown in FIG. 2, the resulting laminate, indicated generally by the numeral 26, comprises a paper substrate or a synthetic fiber substrate 12, optionally having a filler, additive or loading 14, such as a size, a first or inner coating 18 of synthetic hectorite, and a second, separate coating 19 of pigment such as kaolin. As explained above, a binder may be incorporated with hectorite or with both hectorite and pigment coatings. Optimally a plastic overlay 22 is applied to the coated surface of the paper or synthetic fiber. The laminate then may be processed or converted into a container or package and filled with any suitable contents, as known in the art. A representative box is set forth in FIG. 5.

Surlyn is particularly advantageous as a packaging material in that it exhibits strong seal and hot tack, which permits a package having a Surlyn liner to be loaded or filled with hot ingredients. Surlyn, however, has had limited use because of its ease in accumulating a static charge, and therefore in the processing or converting operation, Surlyn can be extremely troublesome and hazardous. Because of this invention, Surlyn can be used especially where its advantages are desired or needed with a minimum of trouble or danger due to any static accumulation.

FIG. 3 shows the resulting laminate, indicated generally by the numeral 26, comprising a paper substrate or synthetic fiber substrate 12, in which the synthetic hectorite 18 and an optional binder such as starch are applied as a size coating together as the first and only size press coating. The hectorite coating 18 is largely discontinuous, filling in the voids in the paper or synthetic fiber structure. A second separate coating 19 of pigment such as kaolin may be optionally applied over the hectorite coating 18. As explained above, a binder may be incorporated with both hectorite and pigment coatings. A plastic overlay 22 is applied to the coated surface of the paper or synthetic fiber.

It will be observed that the resulting laminate of this invention provides an antistatic coating which is buried or encapsulated by the paper or synthetic fiber substrate and/or the plastic overlay. This is advantageous in that it minimizes the exposure of the hectorite coating to many of the converting and packaging process steps, thereby substantially diminishing the loss or flaking of the hectorite. Notwithstanding the fact that the hectorite coating is buried, the laminate exhibits a static dissipation of less than 2 seconds when tested in accordance with the Static Decay Test, MIL-81705 C. Usually the laminate exhibits static dissipation of less than 0.2 seconds. Hence, the laminate can be processed at high speeds, and is substantially free of repulsion or attraction to other products such as food products being packaged. Further, metal or metallized plastic is eliminated, which can be accidentally ingested by the consumer. The outer paper layer is more desirable as a printing surface, and the plastic layer is more desirable as the inner layer for contact with the food content. The kaolin clay coating is preferred in that kaolin has superior ink hold out properties, and further imparts better brightness, opacity, and smoothness to the structure. The other pigments listed herein above are also suitable coatings for the hectorite coating.

We utilize recycle paper or alternatively utilize softwood, hardwood, chemical pulp obtained from softwood and/or hardwood chips liberated into fiber by sulfate, sulfite, sulfide or other chemical pulping processes. Mechanical pulp was obtained by mechanical treatment of softwood and/or hardwood chips, recycle fiber and refined fiber.

Papermaking fibers used to form the antistatic products of the present invention include cellulosic fibers commonly referred to as wood pulp fibers, liberated in the pulping process from softwood (gymnosperms or coniferous trees) and hardwoods (angiosperms or deciduous trees). The particular tree and pulping process used to liberate the tracheld are not critical to the success of the present invention. Cellulosic fibers from diverse material origins may be used to form the web of the present invention, including non-woody fibers liberated from sabal grass, rice straw, banana leaves, paper mulberry (i.e. bast fiber), abaca leaves, pineapple leaves, esparto grass leaves, and fibers from the genus Hesperaloe in the family Agavaceae. Also recycled fibers which may contain any of the above fibers sources in different percentages can be used in the present invention.

Papermaking fibers can be liberated from their source material by any one of the number of chemical pulping processes familiar to one experienced in the art including sulfate, sulfite, polysulfite, soda pulping, etc. The pulp can be bleached if desired by chemical means including the use of chlorine, chlorine dioxide, oxygen, etc. Furthermore, papermaking fibers can be liberated from source material by any one of a number of mechanicallchemical pulping processes familiar to anyone experienced in the art including mechanical pulping, thermomechanical pulping, and chemi thermomechanical pulping. These mechanical pulps can be bleached, if one wishes, by a number of familiar bleaching schemes including alkaline peroxide and ozone bleaching.

Generally in our process the range of hardwood to softwood varies from 0 to 100% to 100% to 0. The preferred range for hardwood to softwood is about 20 to 80 to about 80 to 20; the most preferred range of hardwood comprises about 40 to about 80 percent of the furnish and the softwood comprises about 60 to about 20 percent of the furnish.

It is estimated that 90% of all manufactured goods in the United States are shipped in corrugated boxes. A corrugated box is made from two or more sheets of linerboard and one or more fluted sheets of corrugating medium. The corrugated boxes shown in FIG. 5, when treated with a coating of synthetic hectorite and starch, become antistatic and may be used to transport materials used in electrostatic discharge (ESD)-sensitive environments. The corrugations, or flutes, Impressed into the paperboard give the construction strength and cushioning qualities. FIG. 6 describes the Standard U.S. Corrugated Flutes for corrugated boxes. A-flute is used when stacking strength or cushioning is the primary concern. B-flute gives better crush resistance, folds more easily, and is stronger at the score lines than A- or C-flute. C-flute has qualities that fall between A and B, making it a good compromise and the most widely used corrugated construction. E- and F-flute are very fine fluted structures that fold easily and can be printed with excellent graphics. Further separation of shipped items can be accomplished by having corrugated partitions or dividers for protection and increase in stack strength in palletized loads. Such partitions must also be treated with the antistatic coating.

The invention is further illustrated by the examples set forth hereinbelow. The following examples exemplify the practice of the present invention. It will be appreciated by those skilled in the art that these examples are not to be construed as limiting the present invention, which is defined by the appended claims.

EXAMPLE 1

Coating Make-Up for the First Size Press Application

A 20% aqueous solution of Penford Gum 280 starch was steam heated in a jacketed beaker to 190° F for 30 minutes. Laponite® JS was dispersed in water and the two components were mixed in different ratios to vary the clay-to-binder ratio. Coatings made for size pressing suitably have Brookfield viscosities around 100 cps. The range of Laponite® contents, which varied from 5–18%, were mixed with 20% starch solution in 90-10 and 80-20 ratios. The coatings were applied on the NTC size press, coating both sides of the sheet, at 100 ft.lminute with four drum dryers at 275° F. The NTC size press is a 13 inch wide machine capable of winding at speeds up to 200 fuminute with the drying capacity to handle 50 pounds of sheets. No problems were encountered with drying of the sheet. The paper used in this size press run was a #29 BH paper that had 85% bleached Northern Softwood and 15% Eucalyptus. The paper was also calendered between steel rolls at 100 ft./min. and a pressure of 1250 psi. The static decay times of all the 90-10 ratio samples were less than 1 second after conditioning for 24 hours at 10% RH. Tables I and 2 show static decay times for samples conditioned 10 weeks at 10% RH.

TABLE 1

Static Decay Times for Size Press Coated Paper

| Sample # | Initial Charge (v) | Static Decay Times (sec) +5 kV | | | Static Decay Time (sec) −5 kV | | |
|---|---|---|---|---|---|---|---|
| | | + Charge Accepted | To 50% Dissipation | To 90% Dissipation | − Charge Accepted | To 50% Dissipation | To 90% Dissipation |
| Uncoated Base | >1000 | >1000 | >20 | >20 | 0 | NA | NA |
| | >1000 | >1000 | >20 | >20 | 0 | NA | NA |
| 18% Laponite | 0 | 850 | 0.04 | 0.07 | −950 | 0.03 | 0.07 |
| 90-10 ratio | 0 | 900 | 0.03 | 0.06 | −1000 | 0.03 | 0.07 |
| 18% Laponite | 0 | 900 | 0.04 | 0.08 | −950 | 0.03 | 0.08 |
| 80-20 ratio | 0 | 900 | 0.03 | 0.08 | −1000 | 0.04 | 0.08 |
| 16% Laponite | 0 | 900 | 0.03 | 0.07 | −950 | 0.03 | 0.07 |
| 90-10 ratio | 0 | 900 | 0.03 | 0.07 | −1000 | 0.04 | 0.07 |
| 16% Laponite | 0 | 950 | 0.05 | 0.17 | −950 | 0.05 | 0.12 |
| 80-20 ratio | 0 | 900 | 0.05 | 0.15 | −1000 | 0.05 | 0.15 |
| 14% Laponite | 0 | 900 | 0.04 | 0.11 | −1000 | 0.05 | 0.12 |
| 90-10 ratio | 0 | 900 | 0.04 | 0.10 | −1000 | 0.04 | 0.11 |
| 14% Laponite | 0 | 900 | 0.07 | 0.29 | −1000 | 0.07 | 0.28 |
| 80-20 ratio | 0 | 900 | 0.07 | 0.26 | −1000 | 0.07 | 0.29 |
| 12% Laponite | 0 | 950 | 0.07 | 0.31 | −1000 | 0.06 | 0.25 |

TABLE 1-continued

Static Decay Times for Size Press Coated Paper

| Sample # | Initial Charge (v) | Static Decay Times (sec) +5 kV | | | Static Decay Time (sec) -5 kV | | |
|---|---|---|---|---|---|---|---|
| | | + Charge Accepted | To 50% Dissipation | To 90% Dissipation | - Charge Accepted | To 50% Dissipation | To 90% Dissipation |
| 90-10 ratio | 0 | 950 | 0.17 | 0.33 | -1000 | 0.07 | 0.32 |
| 12% Laponite | 0 | 950 | 0.15 | 0.91 | -1000 | 0.12 | 0.73 |
| 80-20 ratio | 0 | 950 | 0.17 | 1.04 | -1000 | 0.12 | 0.87 |
| 10% Laponite | 0 | 950 | 0.15 | 1.00 | -1000 | 0.14 | 0.87 |
| 90-10 ratio | 0 | 950 | 0.15 | 1.01 | -1000 | 0.14 | 0.94 |
| 10% Laponite | 0 | 900 | 0.39 | 2.81 | -1000 | 0.37 | 2.98 |
| 80-20 ratio | 0 | 900 | 0.45 | 2.78 | -950 | 0.39 | 3.10 |
| 5% Laponite 90-10 ratio | Not tested due to readings >20 seconds | | | | | | |
| 5% Laponite 80-20 ratio | Not tested due to readings >20 seconds | | | | | | |
| Our Coating - 18% | 0 | 900 | 0.04 | 0.12 | -950 | 0.04 | 0.10 |
| Laponite w/A-787 90-10 ratio | 0 | 900 | 0.04 | 0.10 | -1000 | 0.04 | 0.10 |
| Our Coating w/20% | 0 | 850 | 0.06 | 0.22 | -950 | 0.05 | 0.19 |
| starch 90-10 ratio | 0 | 900 | 0.05 | 0.18 | -1000 | 0.05 | 0.16 |
| 100% starch (20% solids) | Not tested due to readings >20 seconds | | | | | | |

Paper used - #29 BH (85% bleached Northern Softwood, 15% Eucalyptus)
10 weeks at 10% relative humidity

TABLE 2

Static Decay Times for Size Press Coated Paper

| | Sample # | Initial Charge (v) | Static Decay Times (sec) +5 kV | | | Static Decay Time (sec) -5 kV | | |
|---|---|---|---|---|---|---|---|---|
| | | | + Charge Accepted | To 50% Dissipation | To 90% Dissipation | - Charge Accepted | To 50% Dissipation | To 90% Dissipation |
| | Uncoated Base | >1000 | >1000 | >20 | >20 | 0 | NA | NA |
| | | >1000 | >1000 | >20 | >20 | 0 | NA | NA |
| | Uncoated Base w/salt | >1000 | >1000 | >20 | >20 | 0 | NA | NA |
| | | >1000 | >1000 | >20 | >20 | 0 | NA | NA |
| L-A | 5% Laponite | 0 | 850 | 0.67 | 7.08 | -950 | 0.46 | 6.36 |
| | | 0 | 850 | 0.43 | 2.29 | -900 | 0.30 | 4.06 |
| L-B | 5% Laponite w/starch | 0 | 900 | 0.36 | 3.21 | -950 | 0.26 | 2.83 |
| | | 0 | 900 | 0.32 | 3.26 | -950 | 0.25 | 2.67 |
| L-C | 5% Laponite w/TSPP | 0 | 900 | 0.06 | 0.23 | -950 | 0.05 | 0.18 |
| | | 0 | 900 | 0.05 | 0.19 | -950 | 0.05 | 0.21 |
| L-D | 5% Laponite w/salt | 0 | 900 | 0.08 | 0.50 | -950 | 0.07 | 0.46 |
| | | 0 | 900 | 0.08 | 0.50 | -900 | 0.06 | 0.37 |
| L-E | 10% Laponite | 0 | 900 | 0.03 | 0.07 | -950 | 0.03 | 0.06 |
| | | 0 | 900 | 0.03 | 0.07 | -950 | 0.03 | 0.06 |
| L-F | 10% Laponite w/starch | 0 | 900 | 0.03 | 0.07 | -950 | 0.03 | 0.06 |
| | | 0 | 950 | 0.03 | 0.08 | -950 | 0.03 | 0.06 |
| L-G | 10% Laponite w/TSPP | 0 | 950 | 0.03 | 0.06 | -950 | 0.03 | 0.05 |
| | | 0 | 900 | 0.03 | 0.07 | -900 | 0.03 | 0.05 |
| L-H | 10% Laponite w/salt | 0 | 950 | 0.03 | 0.07 | -950 | 0.02 | 0.05 |
| | | 0 | 950 | 0.03 | 0.06 | -950 | 0.03 | 0.05 |
| L-I | 14% Laponite | 0 | 950 | 0.03 | 0.06 | -950 | 0.03 | 0.05 |
| | | 0 | 950 | 0.03 | 0.06 | -950 | 0.02 | 0.05 |
| L-J | 14% Laponite w/starch | 0 | 900 | 0.03 | 0.06 | -950 | 0.03 | 0.05 |
| | | 0 | 850 | 0.02 | 0.06 | -950 | 0.03 | 0.05 |
| L-K | 14% Laponite w/TSPP | 0 | 850 | 0.03 | 0.07 | -900 | 0.03 | 0.05 |
| | | 0 | 900 | 0.03 | 0.06 | -950 | 0.02 | 0.06 |
| L-M | 5% Laponite w/extra TSPP | 0 | 900 | 0.05 | 0.14 | -950 | 0.04 | 0.11 |
| | | 0 | 900 | 0.05 | 0.17 | -950 | 0.04 | 0.14 |
| L-N | 10% Laponite w/extra TSPP | 0 | 900 | 0.03 | 0.05 | -950 | 0.02 | 0.06 |
| | | 0 | 900 | 0.03 | 0.05 | -950 | 0.02 | 0.05 |

Paper used - #27 BH-1 Base treated both sides on pilot size press at 100 ft/min.
Calendered at approximately 50 PLI at 180° F. and 60 ft/min.
10 weeks at 10% relative humidity

Effect of Laponite® Type

Figure 4:
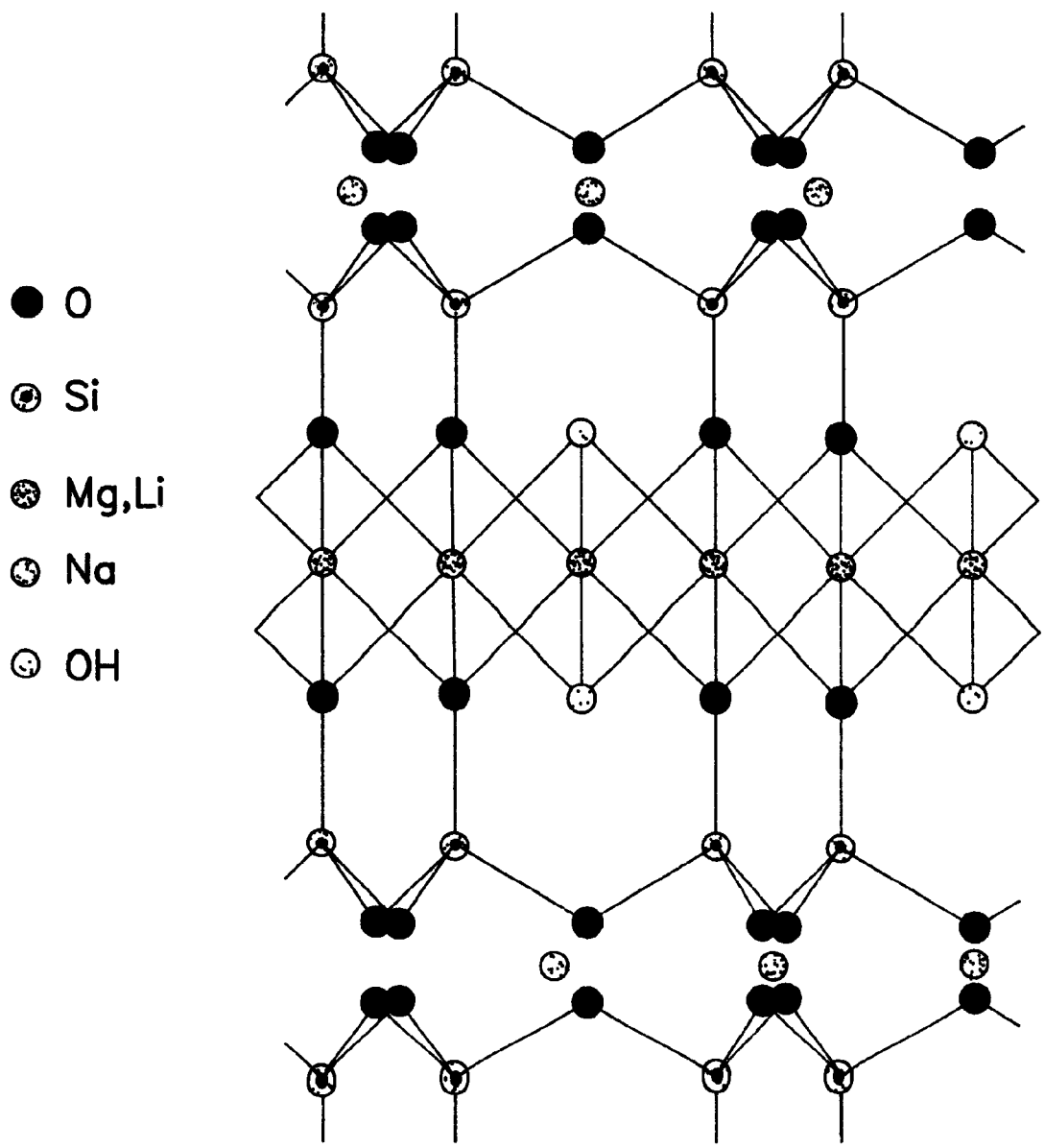
FIG. 4 is a detailed diagram of the laponite clay structure.

Data in Table 3 show the static decay times of different grades of Laponite® after conditioning for 6 weeks at 10% RH. The 5% Laponite® RD, XLG, and D all gelled within the first 24-hours and were not tested. Size press coating of 3% and 5% Laponite® S, RD (3% only), and RDS without a binder had excellent static decay performance after conditioning 10 weeks at 10% RH, data is shown in Table 4. The data demonstrate that many different grades of Laponite® can be used to Impart antistatic properties to paper. The critical issue is that many grades of Laponite® gel at low concentrations in aqueous dispersions. Laponite® synthetic clays are, in general, layered hydrous magnesium silicates, see FIG. 4. They may be classified as smectites which are three layer clays with unlimited layer expansion. The two outer layers are silica tetrahedra with a central octahedral layer which may be dioctahedral or trioctahedral depending on whether the central cation is trivalent (aluminum) with divalent (magnesium) substituents (dioctahedral) or whether the central atom is divalent (magnesium) with monovalent (lithium) substituents (trioctahedral).

Laponites® B, S, and JS are sodium magnesium lithium fluorosilicates. These Laponite grades have the structure of a trioctahedral smectite where the octohedral cation is magnesium and lithium is the substituent:

$$[Si_8(Mg_{5.36}Li_{0.66})O_{20}(OH,F)_4]M^+{}_{0.66}$$

$M^+$ is a metal such as sodium, calcium, or magnesium. Laponite® grades B, S, and JS have some fluorine substitution for hydroxyl and, consequently, can be made up to higher solids concentrations in water without gelling. The Laponite® grades RD, RDS, XLG, XLS, and D are not fluorine substituted and exhibit gelling at lower concentrations. Other smectite clays such as montmorillonite have a central dioctahedral layer where the octahedral cation is aluminum and the substituent is magnesium:

$$[(Si_8(Al_{3.34}Mg_{0.66})O_{20}(OH)_4]M^+{}_{0.66}$$

These clays do not have antistatic properties. Laponite® B (a fluorosilicate) and Laponite® RD (a silicate) both form gel structures in de-ionized water at relatively low concentrations. Laponite® B gels at 5–8wt. % and Laponite® RD gels at 2–3wt. %. The addition of an inorganic peptizing agent with a large anion that is preferentially absorbed at the positively charged platelet edge promotes particle—particle repulsion and low viscosity. Tetrasodium pyrophosphate is the peptizer used to manufacture the S-grades (sol) of Laponite®. Data in Table 3 demonstrate that the type of Laponite® used in paper applications is not critical, although the grades least susceptible to gelling are preferred.

TABLE 3

STATIC DECAY TIMES vs. LAPONITE ® CONCENTRATION AND TYPE 6 weeks at 10% RH

| Sample Number | Initial Coating (V) | Static Decay Time (sec) +5 kV | | | Static Decay Time (sec) −5 kV | | |
|---|---|---|---|---|---|---|---|
| | | + Charge Accepted | To 50% Dissipation | To 90% Dissipation | − Charge Accepted | To 50% Dissipation | To 90% Dissipation |
| Base - No Coating | | Not tested due to Reading >20 seconds | | | | | |
| 10% Laponite ® S | 0 | 950 | 0.03 | 0.07 | −950 | 0.03 | 0.06 |
| No TSPP | 0 | 950 | 0.02 | 0.06 | −950 | 0.02 | 0.06 |
| 5% Laponite ® S | 0 | 900 | 0.03 | 0.06 | −950 | 0.03 | 0.05 |
| | 0 | 950 | 0.03 | 0.06 | −950 | 0.03 | 0.05 |
| 3% Laponite ® S | 0 | 950 | 0.04 | 0.09 | −950 | 0.04 | 0.08 |
| | 0 | 950 | 0.04 | 0.10 | −950 | 0.04 | 0.08 |
| 5% Laponite ® RD | | Not tested due to gelling within 24 hours | | | | | |
| 3% Laponite ® RD | 0 | 950 | 0.05 | 0.17 | −950 | 0.05 | 0.13 |
| | 0 | 950 | 0.05 | 0.20 | −950 | 0.05 | 0.15 |
| 5% Laponite ® RDS | 0 | 950 | 0.03 | 0.07 | −950 | 0.03 | 0.06 |
| | 0 | 950 | 0.03 | 0.06 | −950 | 0.03 | 0.06 |
| 3% Laponite ® RDS | 0 | 950 | 0.05 | 0.11 | −950 | 0.04 | 0.09 |
| | 0 | 900 | 0.04 | 0.10 | −950 | 0.04 | 0.08 |
| 5% Laponite ® XLG | | Not tested due to gelling within 24 hours | | | | | |
| 3% Laponite ® XLG | 0 | 950 | 0.05 | 0.13 | −950 | 0.05 | 0.11 |
| | 0 | 900 | 0.05 | 0.14 | −950 | 0.05 | 0.12 |
| 3% Laponite ® 508 | | Not tested due to gelling within 24 hours | | | | | |
| 5% Laponite ® XLS | 0 | 950 | 0.03 | 0.08 | −950 | 0.03 | 0.07 |
| | 0 | 950 | 0.04 | 0.09 | −950 | 0.04 | 0.08 |
| 3% Laponite ® XLS | 0 | 900 | 0.10 | 0.56 | −950 | 0.09 | 0.45 |
| | 0 | 900 | 0.12 | 0.84 | −950 | 0.10 | 0.61 |
| 5% Laponite ® D | | Not tested due to gelling within 24 hours | | | | | |
| 3% Laponite ® D | 0 | 900 | 0.18 | 1.14 | −900 | 0.13 | 1.03 |
| | 0 | 850 | 0.78 | 6.54 | −900 | 0.48 | 4.82 |

TABLE 4

STATIC DECAY TIMES OF LAPONITE ® WITHOUT A BINDER 10 weeks at 10% RH

| | Initial | Static Decay Time (sec) +5 kV | | | Static Decay Time (sec) −5 kV | | |
|---|---|---|---|---|---|---|---|
| Sample Number | Coating (V) | + Charge Accepted | To 50% Dissipation | To 90% Dissipation | − Charge Accepted | To 50% Dissipation | To 90% Dissipation |
| 5% Laponite ® S | 0 | 850 | 0.05 | 0.26 | −850 | 0.04 | 0.16 |
|  | 0 | 850 | 0.08 | 0.83 | −850 | 0.06 | 0.51 |
| 3% Laponite ® S | 0 | 850 | 0.08 | 0.56 | −850 | 0.06 | 0.37 |
|  | 0 | 850 | 0.08 | 0.62 | −850 | 0.06 | 0.41 |
| 3% Laponite ® RD | 0 | 950 | 0.08 | 0.50 | −950 | 0.06 | 0.37 |
|  | 0 | 850 | 0.08 | 0.65 | −850 | 0.06 | 0.39 |
| 3% Laponite ® RDS | 0 | 850 | 0.08 | 0.63 | −850 | 0.06 | 0.42 |
|  | 0 | 850 | 0.08 | 0.51 | −900 | 0.06 | 0.35 |

EXAMPLE 2

Paper Used in Photographic Sleeves

Colored paper that is extrusion coated with black ethylene vinyl acetate (EVA) is used in photographic sleeves. A size press coating was developed that contains only synthetic clay and starch. Antistatic paper is prepared by either a size press application on the paper machine or by printing the antistatic coating on either or both paper surfaces. Laponite® JS in a starch binder passes the photoactivity test and is, thus, the preferred formulation for photographic applications. Data in Tables 5 and 6 demonstrate the static decay properties of paper with and without the synthetic clay coating.

EXAMPLE 3

Electrographic Paper

Data in Tables 7A and 7B show the applicability of the coating of our invention in making electrographic paper. Coating weights above 0.7 lbs/3,000 sq. ft. ream perform well in electrographic printing.

TABLE 5

Paper Used in Photographic Sleeves

| | | Static Decay Time (sec) +5 kV | | | Static Decay Time (sec) −5 kV | | |
|---|---|---|---|---|---|---|---|
| Sample # | Initial Charge (v) | + Charge Accepted | To 50% Dissipation | To 90% Dissipation | − Charge Accepted | To 50% Dissipation | To 90% Dissipation |
| Coated | 0 | 900 | 0.03 | 0.06 | −950 | 0.03 | 0.06 |
| Paper | 0 | 850 | 0.03 | 0.07 | −900 | 0.03 | 0.06 |
| Base | 500 | 750 | >20 | >20 | 0 | NA | NA |
|  | 450 | 750 | >20 | >20 | 0 | NA | NA |

Initial Conditions
Temperature - 82° deg F.
Humidity - ROOM
Standard at +1000 - 32 seconds

TABLE 6

Paper Used for Photographic Sleeves

| | | Static Decay Time (sec) +5 kV | | | Static Decay Time (sec) −5 kV | | |
|---|---|---|---|---|---|---|---|
| Sample # | Initial Charge (v) | + Charge Accepted | To 50% Dissipation | To 90% Dissipation | − Charge Accepted | To 50% Dissipation | To 90% Dissipation |
| Coated | 0 | 900 | 0.03 | 0.06 | −950 | 0.03 | 0.06 |
| Paper | 0 | 850 | 0.03 | 0.07 | −900 | 0.03 | 0.06 |
| Base | 500 | 750 | >20 | >20 | 0 | NA | NA |
|  | 450 | 750 | >20 | >20 | 0 | NA | NA |

1 Day at 10% Conditions
Temperature - 82° deg F.
Humidity - 10% ± .1% seconds
Standard at +1000 - 32 seconds

TABLE 7A

Laponite ® In Electrographic Paper Coatings

| | FORMULATIONS, % IN FORMULA | | | | | SOLIDS | BROOKFIELD VISC. (cps) | | |
|---|---|---|---|---|---|---|---|---|---|
| SAMPLE ID | LAPONITE ® | PENFORD GUM | TSPP | NaCl | KELGIN MV | (%) | 20 | 50 | 100 |
| REPRO side A | | | | | | | | | |
| REPRO side B | | | | | | | | | |
| BASE | | | | | | | | | |
| L-A | 5 | | | | | 5.00 | | 11.4 | 13.6 |
| L-B | 5 | 0.25 | | | | 5.25 | | 10.2 | 13.9 |
| L-C | 5 | | 0.5 | | | 5.50 | | 12.0 | 13.5 |
| L-D | 5 | | | 0.5 | | 5.50 | | 10.0 | 13.7 |
| L-E | 10 | | | | | 10.00 | 10.0 | 16.6 | 19.1 |
| L-F | 10 | 0.5 | | | | 10.50 | 12.0 | 18.8 | 25.3 |
| L-G | 10 | | 1.0 | | | 11.00 | 12.0 | 16.8 | 18.9 |
| L-H | 10 | | | 1.0 | | 11.00 | 69.5 | 72.0 | 79.3 |
| L-I | 14 | | | | | 14.00 | 18.0 | 24.0 | 32.7 |
| L-J | 14 | 0.7 | | | | 14.70 | 19.0 | 27.6 | 38.4 |
| L-K | 14 | | 1.4 | | | 15.40 | 42.0 | 50.2 | 63.2 |
| L-M | 5 | | 1.25 | | | 6.25 | | 10.8 | 13.3 |
| L-N | 10 | | 2.5 | | | 12.5 | 95.0 | 91.6 | 97.8 |
| L-O | 14 | | | | | 14.00 | 26.0 | 32.0 | 42.4 |
| L-P | 14 | | | 0.25 | | 14.25 | 58.0 | 72.0 | 94.4 |
| | FIRST | TOP COAT | | | | | | | |
| L-Q | 0.5% NaCl | 14% LAPONITE ® (FORMULATION L-O) | | | | | | | |
| L-R | 2.0% NaCl | 14% LAPONITE ® (FORMULATION L-O) | | | | | | | |

27# BH-1 Base treated both sides on pilot size press at 100 ft/min
Calendered at approximately 50 PLI at 180° F. and 60 ft/min.

TABLE 7B

Laponite ® In Electrographic Paper Coatings

| | Ash Coat Weights | Surface Resistivity (ohms/sq) | | |
|---|---|---|---|---|
| Sample ID | (lbs/ream) | 70 Deg F. 50% RH | 100 Deg F. 20% RH | 100 Deg F. 90% RH |
| REPRO Side A | | 1.07E + 07 | 4.00E + 07 | 3.32E + 06 |
| REPRO Side B | | 1.38E + 07 | 6.45E + 07 | 3.40E + 06 |
| BASE | | 1.26E + 11 | 1.16E + 13 | 6.72E + 09 |
| L-A | 0.38 | 1.14E + 09 | 1.33E + 10 | 1.71E + 08 |
| L-B | 0.35 | 1.51E + 09 | 1.68E + 10 | 9.17E + 07 |
| L-C | 0.20 | 7.30E + 08 | 3.92E + 09 | 9.17E + 07 |
| L-D | 0.29 | 5.87E + 08 | 4.71E + 09 | 4.88E + 07 |
| L-E | 0.47 | 1.08E + 08 | 9.75E + 09 | 2.49E + 07 |
| L-F | 0.61 | 1.38E + 08 | 1.33E + 09 | 2.49E + 07 |
| L-G | 0.56 | 9.20E + 07 | 9.61E + 08 | 1.27E + 07 |
| L-H | 0.89 | 3.03E + 07 | 1.38E + 08 | 5.60E + 06 |
| L-I | 0.79 | 2.44E + 07 | 1.24E + 10 | 7.30E + 06 |
| L-J | 1.32 | 3.21E + 07 | 2.58E + 08 | 8.37E + 06 |
| L-K | 1.54 | 1.51E + 07 | 8.77E + 07 | 4.50E + 06 |
| L-M | 0.24 | 6.16E + 08 | 3.36E + 09 | 5.25E + 07 |
| L-N | 1.12 | 4.57E + 07 | 2.62E + 08 | 9.00E + 06 |
| L-O | 1.06 | 2.03E + 07 | 3.15E + 08 | 8.22E + 06 |
| L-P | 1.18 | 1.38E + 07 | 8.03E + 07 | 4.84E + 06 |
| | | First Coat | Top Coat | |
| L-Q | 1.09 | 2.49e + 07 | 2.65E + 08 | 6.85E + 06 |
| L-R | 0.89 | 3.10E + 07 | 5.58E + 08 | 6.81E + 06 |

27# BH-1 Base treated both sides on pilot size press at 100 ft/min
Calendered at approximately 50 PLI at 180 deg. F. and 60 ft/min.

EXAMPLE 4

Antistatic Clay Coatings

Laponite® JS was added to the Delta Brite clay coating formulation to determine the feasibility of making antistatic clay coatings for paper. We found that up to 5% Laponite® JS could be substituted for clay but the viscosity increased substantially. Static decay times of less than one second were achieved but the opacity and brightness of the sheet decreased as the amount of Laponite® increased.

The standard Delta Brite clay coating was applied to both sides of the antistatic base sheet (buried antistatic layer). Static decay times of less than 0.1 second were achieved (at 90% dissipation relevant data is shown in Table 8) and the surface resistivity of the structure was very stable in drastically different humidities. A traditional clay coated sheet would vary five orders of magnitude in surface resistivity when the relative humidity varied from 20% to 90%. The sheet with the Laponite® layer varied only two orders of magnitude.

TABLE 8

ANTISTATIC LAYER BURIED UNDER CLAY COATING

| | Initial Testing | | | | | | |
|---|---|---|---|---|---|---|---|
| | Initial | Static Decay Times (sec) +5 kV | | | Static Decay Times (sec) −5 kV | | |
| Sample # | Charge (v) | + Charge Accepted | To 50% Dissipation | To 90% Dissipation | − Charge Accepted | To 50% Dissipation | To 90% Dissipation |
| Control - Clay coating only on paper | >1000 >1000 | >1000 >1000 | >20 >20 | >20 >20 | 0 0 | NA NA | NA NA |
| Antistatic size press coating on paper without clay coating | 0 0 | 950 950 | 0.03 0.03 | 0.06 0.05 | −900 −900 | 0.03 0.03 | 0.06 0.06 |
| Antistatic size press coating on paper with clay coating on both sides (buried antistatic layer) | 0 0 | 950 950 | 0.03 0.03 | 0.07 0.06 | −900 −900 | 0.03 0.03 | 0.06 0.06 |

Initial testing
Temperature - 78 deg F.
Humidity - ROOM
Standard at +1000 - 32 seconds

EXAMPLE 5

Addition of Clay and Calcium Carbonate

The addition of kaolin clay and/or calcium carbonate to the antistatic coating formulations did not work as antistatic extenders. Higher concentrations of Laponite® were required in the mixed system to achieve static decay times equivalent to those of coatings using Laponite® alone.

EXAMPLE 6

Printing Trial: Dust Removal

Rolls of Sub24 Laser copy paper and B50 Crownbrite Offset Vellum from the Wauna mill were size press coated with a 10% Laponite® JS (no binder) coating at 180 ft./min. on the NTC size press. Both sides of the sheet were coated. The Laponite® coating weight was 1.4 lbs/3,000 sq. ft. ream. Rolls were then calendered, slit to size, and then subjected to a print trial on an offset rotogravure press.

The objective was to minimize dust attraction to the web due to static and to make slitter dust on the web easier to remove because it was no longer being held in place electrostatically. Dust attraction is a particularly bad problem where business forms are punched and perforated in-line with printing. Any particulate on the web prior to printing will transfer to the plate and will cause print defects until it is mechanically removed by the press operator. The run consisted of printing antistatic coated and uncoated rolls of each paper and comparing their print quality.

Static potentials were measured on the moving web by a hand-held Simco FM300 Electrostatic Field meter. The uncoated papers had 8100–8500 volts of static charge while the coated papers had potentials of only 20–40 volts. A tack rag placed at the roll unwind section, collected slitter dust from the roll as it fed into the press for printing. The results were as follows:

1. Print quality was visually better on the antistatic rolls.
2. More slitter dust was removed from the antistatic rolls, and
3. The back side of the antistatic paper accepted laser print very well.

It is apparent that dissipation can play a major roll in print quality. Plants that have invested in web-cleaning vacuum systems could see a dramatic improvement in print quality if the paper they used were antistatic. Removal of dust is very difficult when It is held in place by static. The data set forth in this example supports the conclusion that antistatic paper makes removal of slitter dust and airborne contaminants easier and also minimize the amount of contamination attracted to the web. The other advantage of this invention of the coating was that the antistatic coating did not disrupt the laser ink adhesion or print quality.

EXAMPLE 7

Paperboard

Antistatic size press coatings using Laponite® alone on recycled board or SBS have static decay properties similar to those of metallized film when the coating weight is 1.0 lbs/3,000 sq. ft. ream or higher. Tables 9 and 10 show data for 16 pt. recycled Kalamazoo Board and for 16 pt. SBS board with a starch size alone, with Laponite® plus starch, and with Laponite® alone (i.e. no binder). Table 9 shows initial static decay times with no sample conditioning, and Table 10 shows static decay times after I 0 weeks of conditioning at I 0% relative humidity.

TABLE 9

Static Decay Times for Size Press Coated Board

| Sample # | Initial Charge (v) | Static Decay Times (sec) +5 kV | | | Static Decay Time (sec) −5 kV | | |
|---|---|---|---|---|---|---|---|
| | | + Charge Accepted | To 50% Dissipation | To 90% Dissipation | − Charge Accepted | To 50% Dissipation | To 90% Dissipation |
| Base - 16 pt. Kalamazoo Recycled Board | 0 | 1000 | 0.10 | 1.46 | −1000 | 0.09 | 0.78 |
| | 0 | 1000 | 0.17 | 2.65 | −1000 | 0.14 | 1.38 |
| 15% starch - no laponite | 150 | 850 | 0.04 | >20 | −800 | 0.04 | 0.09 |
| | 50 | 850 | 0.04 | 0.61 | −800 | 0.03 | 0.09 |
| Laponite no starch binder | 0 | 900 | 0.03 | 0.12 | −850 | 0.02 | 0.06 |
| | 0 | 900 | 0.03 | 0.10 | −900 | 0.02 | 0.06 |
| Laponite w/15% starch binder | 0 | 850 | 0.03 | 0.07 | −900 | 0.03 | 0.06 |
| | 0 | 850 | 0.03 | 0.06 | −900 | 0.03 | 0.05 |
| Base - SBS | 0 | 850 | 0.05 | 0.24 | −850 | 0.04 | 0.16 |
| | 0 | 850 | 0.05 | 0.52 | −900 | 0.05 | 0.25 |
| 15% starch - no laponite | 0 | 750 | 0.03 | 0.12 | −750 | 0.03 | 0.06 |
| | 0 | 800 | 0.04 | 0.17 | −800 | 0.03 | 0.08 |
| Laponite no starch binder | 0 | 800 | 0.03 | 0.08 | −800 | 0.02 | 0.05 |
| | 0 | 750 | 0.03 | 0.06 | −800 | 0.02 | 0.05 |
| Laponite w/15% starch binder | 0 | 800 | 0.03 | 0.06 | −850 | 0.03 | 0.06 |
| | 0 | 800 | 0.03 | 0.07 | −800 | 0.02 | 0.05 |

Laponite to starch - 9 to 1 ratio
Initial - no conditioning
Starch - Penford Gum 280

TABLE 10

Static Decay Times for Size Press Coated Board

| Sample # | Initial Charge (v) | Static Decay Times (sec) +5 kV | | | Static Decay Time (sec) −5 kV | | |
|---|---|---|---|---|---|---|---|
| | | + Charge Accepted | To 50% Dissipation | To 90% Dissipation | − Charge Accepted | To 50% Dissipation | To 90% Dissipation |
| Base - 16 pt. Kalamazoo Recycled Board | Not tested due to readings >20 seconds | | | | | | |
| 15% starch - no laponite | Not tested due to readings >20 seconds | | | | | | |
| Laponite - no starch binder | 0 | 850 | 0.04 | 0.25 | −950 | 0.03 | 0.13 |
| | 0 | 850 | 0.04 | 0.16 | −900 | 0.03 | 0.13 |
| Laponite w/15% starch binder | 0 | 900 | 0.04 | 0.27 | −900 | 0.04 | 0.15 |
| | 0 | 900 | 0.04 | 0.16 | −950 | 0.03 | 0.14 |
| Base - SBS | Not tested due to readings >20 seconds | | | | | | |
| 15% starch - no laponite | Not tested due to readings >20 seconds | | | | | | |
| Laponite - no starch binder | 0 | 800 | 0.03 | 0.11 | −850 | 0.03 | 0.08 |
| | 0 | 800 | 0.03 | 0.09 | −850 | 0.03 | 0.08 |
| Laponite w/15% starch binder | 0 | 800 | 0.04 | 0.23 | −800 | 0.04 | 0.12 |
| | 0 | 750 | 0.03 | 0.10 | −800 | 0.03 | 0.08 |

Laponite to starch - 9 to 1 ratio
10 weeks at 10% relative humidity
Starch - Penford Gum 280

EXAMPLE 8

Paper Made With Synthetic Fiber

Paper-like substrates can be made with synthetic polymer fibers that are spunbonded, melt blown, or otherwise formed into a sheet. An example of such a substrate is Tyvek®, a product of DuPont. Tyvek® is a spunbonded polyolefin produced by first spinning very fine continuous strands of high density polyethylene and then bonding them with heat and pressure. Tyvek® can be stiff and paper-like or it may be soft and conformable depending on fiber diameter and basis weight. The paper-like product can be used as is or It can be overcoated with a pigmented coating for enhanced graphics. Typical applications are for floppy disk sleeves, mailing envelopes, labels, courier pouches, and in garments for clean room environments. Tyvek® samples in Example 8 were coated with Laponite® JS in an epoxy ester binder. The aqueous coating contained 16.2 wt. % Laponite® and 3.8 wt. % binder. Coatings were made using Meyer draw down rods to yield coating weights between 0.3 and 0.6 lbs.13,000 sq. ft. ream. The static decay times (initial and 48 hrs. at 10% RH) are shown in Table 11 for samples with and without the hectorite coating on both high and low basis weight Tyvek®. The static decay properties listed in Table 11 are excellent and extend to other spunbonded, spun laced, melt blown, or substrates formed in a papermaking process with any combination of synthetic and wood fiber such as polypropylene, polyester, aramid, or acrylic. Tables 12A and 12B demonstrate the excellent static decay times for other synthetic materials.

TABLE 11

Static Decay Times for Tyvek ® Samples

| All samples corona treated Initial Testing | | Static Decay Times (sec) +5 kV | | | Static Decay Time (sec) −5 kV | | |
|---|---|---|---|---|---|---|---|
| Sample Identification | Initial Charge (v) | + Charge Accepted | To 50% Dissipation | To 90% Dissipation | − Charge Accepted | To 50% Dissipation | To 90% Dissipation |
| Tyvek ® - no coating | >1000 | >1000 | >20 | >20 | 0 | NA | NA |
| | >1000 | >1000 | >20 | >20 | 0 | NA | NA |
| Tyvek ® - high basis weight | 0 | 850 | 0.02 | 0.06 | −800 | .02 | .05 |
| | 0 | 750 | 0.03 | 0.06 | −800 | .03 | .05 |
| Tyvek ® - low basis weight | 0 | 950 | 0.03 | 0.05 | −950 | 0.03 | 0.05 |
| | 0 | 850 | 0.03 | 0.06 | −900 | 0.03 | 0.05 |
| Testing after 48 hours at 10% RH | | | | | | | |
| Tyvek ® - no coating | | NOT TESTED DUE TO READINGS >20 SECONDS. | | | | | |
| Tyvek ® - high basis weight | 0 | 850 | 0.02 | 0.06 | −850 | 0.03 | 0.05 |
| | 0 | 850 | 0.03 | 0.06 | −900 | 0.03 | 0.05 |
| Tyvek ® - low basis weight | 0 | 950 | 0.02 | 0.06 | −1000 | 0.03 | 0.05 |
| | 0 | 900 | 0.03 | 0.06 | −850 | 0.03 | 0.05 |

TABLE 12A

Static Decay Times for Synthetic Fiber Materials

| | | | Static Decay Times (sec) +5 kV | | | Static Decay Time (sec) −5 kV | | |
|---|---|---|---|---|---|---|---|---|
| Sample # | Type | Initial Charge (v) | + Charge Accepted | To 50% Dissipation | To 90% Dissipation | − Charge Accepted | To 50% Dissipation | To 90% Dissipation |
| Typar ® 3141 Uncoated | Spunbonded polypropylene 8 Denier | −150 | 150 | 0.02 | 0.03 | −450 | 0.03 | >20 |
| Coated-antistat | Thickness: 8.2 mils | 0 | 950 | 0.03 | 0.07 | −950 | 0.03 | 0.05 |
| Reemay ® 2033 Uncoated | Spunbonded polyester 4 Denier | 500 | 800 | >20 | >20 | 0 | na | na |
| Coated-antistat | Thickness: 17.4 mils | 0 | 800 | 0.03 | 0.06 | 0 | 0.02 | 0.05 |
| Tyvek ® 1079 Uncoated | Spunbonded HDPE Thickness: | >1000 | >1000 | >20 | >20 | 0 | na | na |
| Coated-antistat | 8.0 mils | 0 | 850 | 0.03 | 0.07 | −900 | 0.03 | 0.05 |
| Kevlar ® 29 Uncoated | Kevlar Fabric 200 Denier | 50 | 900 | 3.59 | >20 | −900 | 2.17 | >20 |
| Coated-antistat | Weight: 2.6 oz./yd. | 0 | 1000 | 0.04 | 0.08 | −1000 | 0.03 | 0.06 |
| Gore-Tex ™ Uncoated | PTFE Fabric 400 Denier | −1000 | 0 | na | na | >−1000 | >20 | >20 |
| Coated-antistat | Weight: 8.8 oz./yd. | 0 | 900 | 0.04 | 0.13 | −900 | 0.04 | 0.10 |

Antistatic Coating: Laponite JS (18%):Epoxy Ester; 9:1 ratio
Uncoated samples tested at room conditions
Coated samples tested after 1 day at 10% relative humidity

TABLE 12B

Static Decay Times for Nomex Paper (Aramid Type 410)

| Sample # | Initial Charge (v) | Static Decay Times (sec) +5 kV | | | Static Decay Time (sec) −5 kV | | |
|---|---|---|---|---|---|---|---|
| | | + Charge Accepted | To 50% Dissipation | To 90% Dissipation | − Charge Accepted | To 50% Dissipation | To 90% Dissipation |
| Uncoated 2 mils | 950 | >1000 | >20 | >20 | 0 | na | na |
| Nomex paper | 850 | >1000 | >20 | >20 | 0 | na | na |
| Uncoated 3 mils | 500 | 750 | >20 | >20 | 0 | na | na |
| Nomex paper | 900 | >1000 | >20 | >20 | 0 | na | na |
| Uncoated 5 mils | >1000 | >1000 | >20 | >20 | 0 | na | na |
| Nomex paper | >1000 | >1000 | >20 | >20 | 0 | na | na |
| Coated 2 mils | 0 | 950 | 0.03 | 0.06 | −1000 | 0.02 | 0.05 |
| Nomex paper | 0 | 950 | 0.03 | 0.06 | −950 | 0.03 | 0.05 |
| Coated 3 mils | 0 | 950 | 0.03 | 0.07 | −950 | 0.03 | 0.05 |
| Nomex paper | 0 | 900 | 0.03 | 0.06 | −900 | 0.03 | 0.05 |
| Coated 5 mils | 0 | 850 | 0.03 | 0.06 | −900 | 0.03 | 0.06 |
| Nomex paper | 0 | >1000 | 0.03 | 0.06 | >−1000 | 0.03 | 0.06 |

Laponite (18%) with epoxy ester binder at a 9:1 ratio
Uncoated at initial testing (room conditions)
Coated at 1 day at 10% relative humidity

EXAMPLE 9

Corrugated Boxes

FIGS. 5 and 6 illustrate different corrugation structures appropriate for paper or paperboard materials and provide typical corrugator roll profiles. After the application of an antistatic size press coating of synthetic hectorite, the paper or paperboard is formed into appropriate corrugated structures. The surface resistivity of such structures that contain inner and outer layers treated with hectorite is from $10^6$ to $10^{11}$ ohms/sq. inch. The corrugated structures are cost effective and durable. The box can be used in ESD-sensitive environments to ship components such as nuts, bolts, resistors, capacitors, etc. that do not require Faraday Cage shielding but which do require that all materials in the plant be static dissipative. Since the container itself is antistatic, there is no need for the extra cost of repetitive bagging. An additional advantage is that the paper structures remain white and printable vs. the typical black box with carbon black added as the antistatic material.

EXAMPLE 10

Extrusion Coated Paper

A size press coating was developed that contains only synthetic clay and starch. The coating was applied by the size press on both sides of the sheet and then extrusion coated on one side or two sides. Further data are set forth in Tables 13, 14, and 15. Table 13 shows static decay times for two different basis weight papers (42# and 17#) sized with synthetic clay and starch and then coated on one or two sides with low density polyethylene (LDPE). The extrusion coating weights were also varied from 5 to 30 pounds per 3,000 sq. ft. ream. Table 14 shows the effect with and without the antistatic size press coating. Table 15 shows data for paperboard that is extrusion coated with DuPont's 1652 SB Surlyn®, a resin that builds very large triboelectric charges in a moving web. Data demonstrate that the coating is effective in dissipating electrostatic potentials as a buried layer.

TABLE 13

EFFECT OF EXTRUSION COAT WEIGHT ON STATIC DECAY TIMES

| 1 day at 10% RH Sample # | Initial Charge (V) | + Charge Accepted | STATIC DECAY TIME (sec) +5 kV | | − Charge Accepted | STATIC DECAY TIME (sec) −5 kV | |
|---|---|---|---|---|---|---|---|
| | | | 50% | 10% | | 50% | 10% |
| KODAK 42# PAPER | 0 | 700 | 0.03 | 0.06 | −750 | 0.03 | 0.06 |
| LDPE LIGHT WT. 1 SIDE | 0 | 750 | 0.03 | 0.08 | −750 | 0.03 | 0.06 |
| KODAK 42# PAPER | 0 | 750 | 0.03 | 0.08 | −700 | 0.02 | 0.05 |
| LDPE LIGHT WT. 2 SIDED | 0 | 750 | 0.03 | 0.08 | −700 | 0.02 | 0.05 |
| KODAK 42# PAPER | 0 | 700 | 0.03 | 0.08 | −750 | 0.03 | 0.08 |
| LDPE HEAVY WT. 1 SIDE | 0 | 700 | 0.03 | 0.07 | −750 | 0.02 | 0.06 |
| KODAK 42# PAPER | 50 | 700 | 0.03 | 0.11 | −650 | 0.02 | 0.05 |
| LDPE HEAVY WT. 2 SIDED | 50 | 750 | 0.03 | 0.10 | −750 | 0.02 | 0.06 |
| 17# PAPER | 0 | 850 | 0.03 | 0.07 | −900 | 0.03 | 0.07 |
| LDPE LIGHT WT. 1 SIDE | 0 | 900 | 0.03 | 0.06 | −950 | 0.03 | 0.07 |
| 17# PAPER | 0 | 750 | 0.03 | 0.06 | −850 | 0.03 | 0.07 |
| LDPE LIGHT WT. 2 SIDED | 0 | 800 | 0.03 | 0.07 | −900 | 0.02 | 0.07 |
| 17# PAPER | 0 | 750 | 0.03 | 0.07 | −800 | 0.02 | 0.07 |

TABLE 13-continued

EFFECT OF EXTRUSION COAT WEIGHT ON STATIC DECAY TIMES

| 1 day at 10% RH Sample # | Initial Charge (V) | + Charge Accepted | STATIC DECAY TIME (sec) +5 kV 50% | 10% | − Charge Accepted | STATIC DECAY TIME (sec) −5 kV 50% | 10% |
|---|---|---|---|---|---|---|---|
| LDPE HEAVY WT. 1 SIDE | 0 | 800 | 0.03 | 0.08 | −750 | 0.02 | 0.05 |
| 17# PAPER | 0 | 700 | 0.03 | 0.08 | −700 | 0.03 | 0.06 |
| LDPE HEAVY WT. 2 SIDED | 0 | 750 | 0.03 | 0.09 | −750 | 0.03 | 0.06 |

TABLE 14

PAPER WITH AND WITHOUT ANTISTAT EXTRUSION COATED WITH LDPE

| 1 week at 10% RH Sample # | Initial Charge (V) | + Charge Accepted | STATIC DECAY TIME (sec) +5 kV 50% | 10% | − Charge Accepted | STATIC DECAY TIME (sec) −5 kV 50% | 10% |
|---|---|---|---|---|---|---|---|
| BASE PAPER (NO ANTISTAT) | >1000 | >1000 | >20 | >20 | 0 | NA | NA |
| LDPE 1 SIDE | >1000 | >1000 | >20 | >20 | 0 | NA | NA |
| BASE PAPER (NO ANTISTAT) | >1000 | >1000 | >20 | >20 | 0 | NA | NA |
| LDPE 2 SIDES | >1000 | >1000 | >20 | >20 | 0 | NA | NA |
| ANTISTAT SIZE PRESS WITH LDPE 1 SIDE | 0 | 900 | 0.03 | 0.10 | −950 | 0.03 | 0.07 |
|  | 0 | 800 | 0.03 | 0.06 | −850 | 0.03 | 0.05 |
| ANTISTAT SIZE PRESS WITH LDPE 2 SIDES | 0 | 800 | 0.03 | 0.09 | −800 | 0.03 | 0.06 |
|  | 0 | 900 | 0.03 | 0.08 | −900 | 0.03 | 0.06 |

TABLE 15

PAPER WITH AND WITHOUT ANTISTAT EXTRUSION COATED WITH SURLYN ®

| 1 day at 10% RH Sample # | Initial Charge (V) | + Charge Accepted | STATIC DECAY TIME (sec) +5 kV 50% | 10% | − Charge Accepted | STATIC DECAY TIME (sec) −5 kV 50% | 10% |
|---|---|---|---|---|---|---|---|
| BASE PAPER (NO ANTISTAT) | >1000 | >1000 | >20 | >20 | 0 | NA | NA |
| 1652SB 1 SIDE | >1000 | >1000 | >20 | >20 | 0 | NA | NA |
| BASE PAPER (NO ANTISTAT) | >1000 | >1000 | >20 | >20 | 0 | NA | NA |
| 1652SB 2 SIDED | >1000 | >1000 | >20 | >20 | 0 | NA | NA |
| ANTISTAT SIZE PRESS WITH 1652SB 1 SIDE | 0 | 650 | 0.02 | 0.07 | −850 | 0.03 | 0.06 |
|  | 0 | 750 | 0.03 | 0.06 | −800 | 0.02 | 0.06 |
| ANTISTAT SIZE PRESS WITH 1652SB 2 SIDES | 0 | 700 | 0.03 | 0.15 | −600 | 0.02 | 0.04 |
|  | 50 | 700 | 0.03 | 0.11 | −600 | 0.02 | 0.04 |

EXAMPLE 11

MARAVAC®—Bacon Board

Table 16 shows static decay times for different placements of the antistatic coating in the MARAVAC® board construction. MARAVAC® is a paperboard insert used to package bacon. It is constructed of paperboard stock that is: (1) wax impregnated, (2) extrusion coated with LDPE (clear or white), (3) printed with color graphics, and then (4) overcoated with a lacquer. Data in Table 16 demonstrate three different placements of the hectorite coating in the MARAVAC® construction. The coating may be:

(1) a size press coating of the paperboard prior to wax Impregnation. The resulting paperboard has the following layered construction: top layer-antistatic coating, middle layer-base (board) coating, and bottom layer-antistatic coating (A/B/A as shown in Table 16);

(2) a printed coating on the wax surface. The resulting paperboard has the following layered construction: top layer- antistatic coating, second layer-wax, third layer-base (board), fourth layer-wax, and bottom layer is antistatic coating (A/W/B/W/A as shown in Table 16); or (3) a printed coating on the PE surface. The resulting paperboard has the following layered construction: top layer overcoat, second layer—antistatic coating, third layer—polyethylene, fourth layer—wax, fifth layer—base (board), sixth layer—wax, seventh layer— polyethylene, eighth layer—antistatic coating, and the bottom layer is an overcoat (O/A/P/W/B/W/P/A/O as shown in Table 16).

Static decay times for each construction are shown in Table 16 for 10 weeks at 10% R.H. The data highlighted in the table show static decay performance for constructions buried by one, two, or three insulating layers.

TABLE 16

MARAVAC ® BOARD
TIME AT 10% RH (weeks)

| SAMPLE | INITIAL | 1 | 2 | 3 | 4 | 5 | 6 | 7 | 8 | 9 | 10 |
|---|---|---|---|---|---|---|---|---|---|---|---|
| BOARD | >20 | >20 | >20 | >20 | >20 | >20 | >20 | >20 | >20 | >20 | >20 |
| W/B/W | >20 | >20 | >20 | >20 | >20 | >20 | >20 | >20 | >20 | >20 | >20 |
| P/W/B/W/P | 4.87 | >20 | >20 | >20 | >20 | >20 | >20 | >20 | >20 | >20 | >20 |
| O/P/W/B/W/P/O | 9.24 | >20 | >20 | >20 | >20 | >20 | >20 | >20 | >20 | >20 | >20 |
| A/B/A | 0.06 | 0.07 | 0.08 | 0.09 | 0.12 | 0.11 | 0.11 | 0.11 | 0.12 | 0.12 | 0.11 |
| A/W/B/W/A | 0.08 | 0.21 | 0.28 | 0.29 | 0.52 | 0.42 | 0.41 | 0.64 | 0.42 | 0.45 | 0.42 |
| A/P/W/B/W/P/A | 0.07 | 0.09 | 0.08 | 0.12 | 0.12 | 0.15 | 0.14 | 0.17 | 0.14 | 0.26 | 0.15 |
| W/A/B/A/W | 0.07 | 0.09 | 0.12 | 0.12 | 0.13 | 0.15 | 0.16 | 0.15 | 0.14 | 0.18 | 0.16 |
| P/W/A/B/A/W/P WHITE PE | 0.12 | 0.20 | 0.14 | 0.13 | 0.14 | 0.15 | 0.13 | 0.16 | 0.13 | 0.16 | 0.16 |
| P/W/A/B/A/W/P CLEAR PE | 0.15 | 0.46 | 0.16 | 0.60 | 0.17 | 0.19 | 0.16 | 0.20 | 0.19 | 0.16 | 0.19 |
| O/P/W/A/B/A/W/P/O WHITE PE | 0.11 | 0.13 | 0.38 | 0.11 | 0.10 | 0.11 | 0.11 | 0.10 | 0.10 | 0.09 | 0.11 |
| O/P/W/A/B/A/W/P/O CLEAR PE | 0.10 | 0.13 | 0.13 | 0.14 | 0.13 | 0.12 | 0.10 | 0.13 | 0.13 | 0.14 | 0.13 |
| P/A/W/B/W/A/P WHITE PE | 0.36 | 0.61 | 0.95 | 0.77 | 0.79 | 1.26 | 1.68 | 1.7 | 1.56 | 1.81 | 1.20 |
| P/A/W/B/W/A/P CLEAR PE | 0.11 | 0.16 | 0.15 | 0.26 | 0.19 | 0.16 | 0.17 | 0.19 | 0.18 | 0.23 | 0.22 |
| O/P/A/W/B/W/A/P/O WHITE PE | 0.65 | 0.79 | 0.77 | 0.97 | 1.80 | 2.17 | 1.21 | 1.30 | 1.61 | 2.38 | 1.27 |
| O/P/A/W/B/W/A/P/O CLEAR PE | 0.51 | 0.39 | 0.51 | 0.43 | 0.53 | 0.47 | 0.49 | 0.52 | 0.51 | 0.54 | 0.67 |
| O/A/P/W/B/W/P/A/O | 0.07 | 0.11 | 0.12 | 0.15 | 0.10 | 0.14 | 0.22 | 0.24 | 0.24 | 0.40 | 0.24 |

B - BASE (BOARD)
WHITE AND CLEAR PE COATINGS USED AS INDICATED
W -WAX
P-POLYETHYLENE
O-OVERCOAT
ANTISTATIC COATING

We claim:

1. A laminate exhibiting static decay of at least 90% in less than 0.2 seconds while measured at +/−5,000 volts, at 10% relative humidity and 24 hours conditioning, which comprises: a synthetic fiber substrate selected from the group of manufactured polymers or copolymers consisting of polyethylene, polypropylene, polyaramid, and polyacrylic moieties or a paper substrate, a first coating on at least one surface of said substrate comprising synthetic hectorite clay comprising fluoride ions.

2. The laminate of claim 1 wherein optionally a second coating comprising organic or inorganic pigment is applied at least on one of said first coatings.

3. The laminate according to claim 2 wherein said first coating and said second coating are applied to both surfaces of said synthetic fiber or paper substrate.

4. The laminate according to claim 2 wherein a plastic film overlays one coated surface only.

5. The laminate according to claim 2 wherein a plastic film overlays both coated surfaces.

6. The laminate according to claim 1 wherein said hectorite clay coating comprises about 0.5 to 7.5 weight percent of said synthetic fiber or paper substrate.

7. A laminate exhibiting static decay of at least 90% in less than 0.2 seconds while measured at +/−5,000 volts, at 10% relative humidity and 24 hours conditioning, which comprises: a paper substrate, a first discontinuous coating on at least one surface of said paper substrate comprising synthetic hectorite clay containing fluoride ions.

8. The laminate of claim 7 wherein optionally a second coating comprising organic or inorganic pigment is applied over at least one of said first coatings.

9. The laminate according to claim 7 wherein said first discontinuous coating and said second coating are applied by size press to both surfaces of said paper substrate.

10. The laminate according to claim 7 wherein said discontinuous coating is applied by a size press and the second pigmented coating is applied by blade coating method.

11. The laminate of claim 7 wherein a first coating on at least one surface of said paper substrate comprises synthetic hectorite clay containing fluoride ions.

12. The laminate according to claim 7, wherein said hectorite clay coating comprises about 0.5 to 7.5 weight percent of said substrate, and optionally a second coating comprises about 10 to 35 weight percent of said substrate said second coating comprising pigments selected from the group consisting of kaolin clay, zinc, sulfide, titanium dioxide, talc, bentonite, glass powder, alumina, calcium carbonate, hollow glass or organic spheres applied over at least one of said first coatings.

13. The laminate of claim 1 exhibiting static decay of at least 90% in less than 0.2 seconds while measured at +/−5,000 volts, at 10% relative humidity and 24 hours conditioning which comprises: a synthetic fiber substrate selected from the group of manufactured polymers or copolymers consisting of polyethylene, polypropylene, polyester, polyaramid, and polyacrylic moieties or a paper substrate and hectorite clay containing fluoride ions.

14. The laminate according to claim 13 wherein said hectorite clay coating comprises about 0.5 to 7.5 weight percent of said paper substrate and a second coating is kaolin clay pigment which comprises about 10 to 35 weight percent of said paper substrate.

15. The laminate according to claim 14 wherein said hectorite clay coating comprises about 0.5 to 7.5 weight percent of said substrate.

16. The laminate of claim 11 which comprises: a paper substrate, a first discontinuous coating on at least one surface of said paper substrate comprising synthetic hectorite clay containing fluoride ions.

17. A coated paper web exhibiting static decay of at least 90% in less than 0.2 seconds while measured at +/−5,000 volts, at 10% relative humidity and 24 hours conditioning, which comprises: a paper substrate, a first coating on at least one surface of said paper substrate comprising synthetic hectorite clay containing fluoride ions.

18. The coated paper web of claim 17 wherein optionally a second coating comprising organic or inorganic pigment covers at least one of said first coatings.

19. The coated web of claim 18 wherein said first coating and said second coating are applied to both surfaces of said web.

20. The coated paper web of claim 17 exhibiting static decay of at least 90% in less than 0.2 seconds while measured at +/−5,000 volts, at 10% relative humidity and 24 hours conditioning, which comprises: a paper substrate, a first coating on at least one surface of said paper substrate comprising synthetic hectorite clay containing fluoride ions and optionally a second coating comprising pigment selected from the group consisting of kaolin clay, zinc sulfide, titanium dioxide, talc, bentonite, glass powder, alumina, calcium carbonate, hollow glass or organic spheres, applied over at least one of said first coatings.

21. The coated paper web of claim 20 exhibiting static decay of at least 90% in less than 0.2 seconds while measured at +/−5,000 volts, at 10% relative humidity and 24 hours conditioning, which comprises: a paper substrate, a first coating on at least one surface of said paper substrate comprising synthetic hectorite clay and optionally a second clay coating comprising kaolin clay applied over at least one of said first coatings.

22. A method of making a laminate exhibiting static decay of at least 90% in less than 0.2 seconds while measured at +/−5,000 volts, at 10% relative humidity and 24 hours conditioning, which comprises: forming a paper web, applying a first coating on at least one surface of said paper web with a synthetic hectorite clay containing fluoride ions optionally applying a second coating comprising an organic or inorganic pigment at least on one surface of said paper web directly onto said first coating.

23. The method according to claim 22 wherein said coating of hectorite clay is applied to said paper web as an aqueous dispersion comprising about 3 to 18 weight percent hectorite and a peptizer for stabilizing said dispersion, and said coating is dried at a temperature of at least about 125° F.

24. The method of making a laminate according to claim 22 exhibiting static decay of at least 90% in less than 0.2 seconds while measured at +/−5,000 volts, at 10% relative humidity and 24 hours conditioning, which comprises: forming a paper web, applying a first coating on at least one surface of said paper web with a synthetic hectorite clay containing fluoride ions optionally applying a second coating consisting of pigment selected from the group consisting of kaolin clay, zinc sulfide, titanium dioxide, talc, bentonite, glass powder, alumina, calcium carbonate, hollow glass or organic spheres applied over at least on one surface of said paper web directly onto said first coating.

25. A method of making a laminate according to claim 22 exhibiting static decay of at least 90% in less than 0.2 seconds while measured at +/−5,000 volts, at 10% relative humidity and 24 hours conditioning, which comprises: forming a paper web, applying a first coating on at least one surface of said paper web with a synthetic hectorite clay optionally applying a second coating comprising kaolin clay at least on one surface of said paper web directly onto said first coating.

26. A laminate formed into corrugated structures exhibiting static decay of at least 90% in less than 0.2 seconds while measured at +/−5,000 volts, at 10% relative humidity and 24 hours conditioning, which comprises: a paper substrate, a first coating on at least one surface of said paper substrate comprising synthetic hectorite clay containing fluoride ions and second coating comprising pigment from the group consisting of kaolin clay, zinc sulfide, titanium dioxide, talc, bentonite, glass powder, alumina, calcium carbonate, hollow glass or organic spheres applied over at least one of said first coatings.

* * * * *